United States Patent
Gupta et al.

(10) Patent No.: US 10,706,564 B2
(45) Date of Patent: Jul. 7, 2020

(54) SYSTEMS, METHODS, AND MEDIA FOR DETERMINING OBJECT MOTION IN THREE DIMENSIONS FROM LIGHT FIELD IMAGE DATA

(71) Applicant: Wisconsin Alumni Research Foundation, Madison, WI (US)

(72) Inventors: Mohit Gupta, Madison, WI (US); Sizhuo Ma, Madison, WI (US); Brandon Smith, Freemont, CA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 98 days.

(21) Appl. No.: 15/951,131

(22) Filed: Apr. 11, 2018

(65) Prior Publication Data

US 2019/0318486 A1 Oct. 17, 2019

(51) Int. Cl.
| | |
|---|---|
| G06K 9/00 | (2006.01) |
| G06T 7/285 | (2017.01) |
| G06T 7/269 | (2017.01) |
| H04N 13/243 | (2018.01) |
| H04N 13/00 | (2018.01) |

(52) U.S. Cl.
CPC ............ *G06T 7/285* (2017.01); *G06T 7/269* (2017.01); *H04N 13/243* (2018.05); *H04N 2013/0085* (2013.01)

(58) Field of Classification Search
CPC .................................................. G06T 7/285
See application file for complete search history.

(56) References Cited

U.S. PATENT DOCUMENTS

| | | | | |
|---|---|---|---|---|
| 2014/0239071 | A1* | 8/2014 | Hennick | G06K 7/10732 |
| | | | | 235/455 |
| 2014/0270345 | A1* | 9/2014 | Gantman | G01C 21/26 |
| | | | | 382/103 |
| 2015/0332475 | A1* | 11/2015 | Shroff | H04N 5/23254 |
| | | | | 382/103 |
| 2017/0243361 | A1* | 8/2017 | Schaffert | G06T 7/564 |
| 2018/0342075 | A1* | 11/2018 | Wang | H04N 13/218 |
| 2019/0075284 | A1* | 3/2019 | Ono | H04N 13/20 |

OTHER PUBLICATIONS

Dansereau, et al., Plenoptic flow: Closed-form visual odometry for light field cameras. In: IEEE/RSJ International Conference on Intelligent Robots and Systems (IROS), IEEE (2011) 4455-4462.

(Continued)

*Primary Examiner* — Oneal R Mistry
(74) *Attorney, Agent, or Firm* — Quarles & Brady LLP

(57) ABSTRACT

In accordance with some embodiments, systems, methods and media for determining object motion in three dimensions using light field image data are provided. In some embodiments, a system for three dimensional motion estimation is provided, comprising: an image sensor; optics that create many images of a scene; and a hardware processor configured to: cause the image sensor to capture a first plurality of images; generate a first light field; cause the image sensor to capture a second plurality of images at a second time; generate a second light field; calculate light field gradients using the first light field and second light field; and calculate, for each point in the scene, three dimensional motion using the light field gradients by applying a constraint to the motion in the scene.

24 Claims, 26 Drawing Sheets

(56) References Cited

OTHER PUBLICATIONS

Gottfried, et al., Computing range flow from multi-modal kinect data. In: International Symposium on Visual Computing, Springer (2011) 758-767.
Heber, et al., Scene flow estimation from light fields via the preconditioned primal dual algorithm. In: German Conference on Pattern Recognition, Springer (2014) 3-14.
Horn, et al., Determining optical flow. Artificial intelligence 17(1-3) (1981) 185-203.
Hung, et al., Consistent binocular depth and scene flow with chained temporal profiles. International journal of computer vision (IJCV) 102(1-3) (2013) 271-292.
Jaimez, et al., A primal-dual framework for real-time dense rgb-d scene flow. In: IEEE International Conference on Robotics and Automation (ICRA), IEEE (2015) 98-104.
Johannsen, et al., On linear structure from motion for light field cameras. In: IEEE International Conference on Computer Vision (ICCV), IEEE (2015) 720-728.
Lucas, et al., An iterative image registration technique with an application to stereo vision. In: International Joint Conference on Artificial Intelligence (IJCAI) (1981) 674-679.
Navarro, et al., Variational scene flow and occlusion detection from a light field sequence. In: International Conference on Systems, Signals and Image Processing (IWSSIP), IEEE (2016) 1-4.
Neumann, et al., Polydioptric camera design and 3d motion estimation. In: IEEE Conference on Computer Vision and Pattern Recognition (CVPR). vol. 2, IEEE (2003) II-294.
Srinivasan, et al., Oriented light-field windows for scene flow. In: IEEE International Conference on Computer Vision (ICCV), IEEE (2015) 3496-3504.
Sun, et al., Layered rgbd scene flow estimation. In: IEEE Conference on Computer Vision and Pattern Recognition (CVPR), IEEE (2015) 548-556.
Sun, et al., Secrets of optical flow estimation and their principles. In: IEEE Conference on Computer Vision and Pattern Recognition (CVPR), IEEE (2010) 2432-2439.
Vedula, et al., Three-dimensional scene flow. In: IEEE International Conference on Computer Vision (ICCV). vol. 2., IEEE (1999) 722-729.
Wedel, et al., Efficient dense scene flow from sparse or dense stereo data. In: European Conference on Computer Vision (ECCV), Springer (2008) 739-751.
Zhang, et al., The light field 3d scanner. In: IEEE International Conference on Computational Photography (ICCP), IEEE (2017) 1-9.

\* cited by examiner

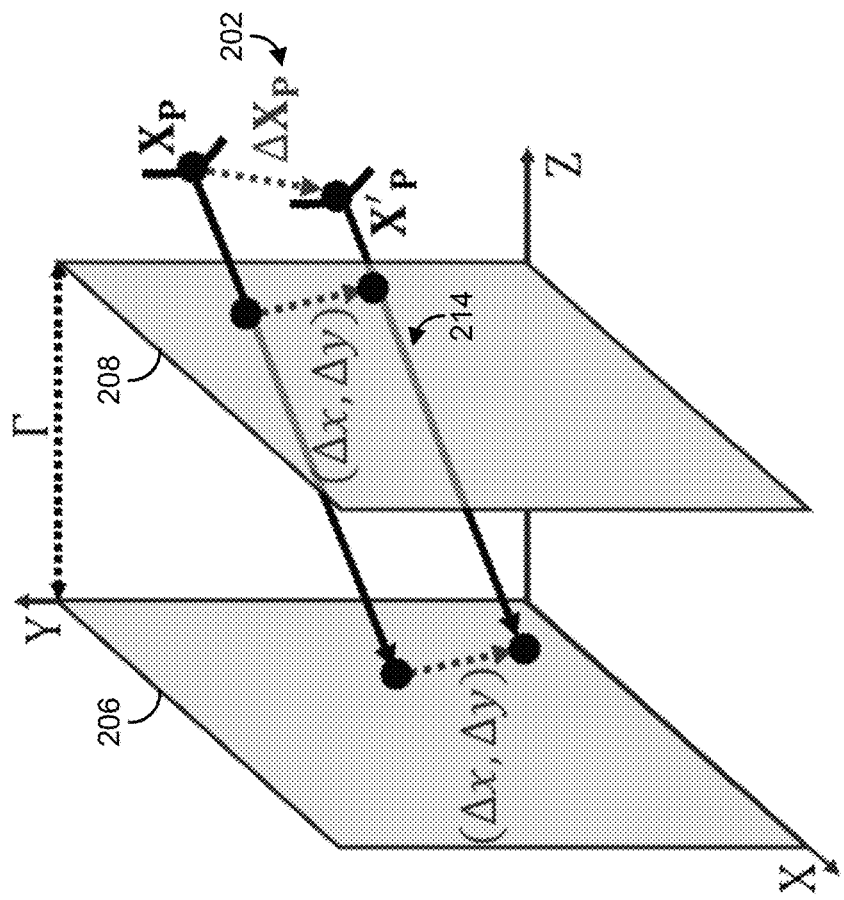
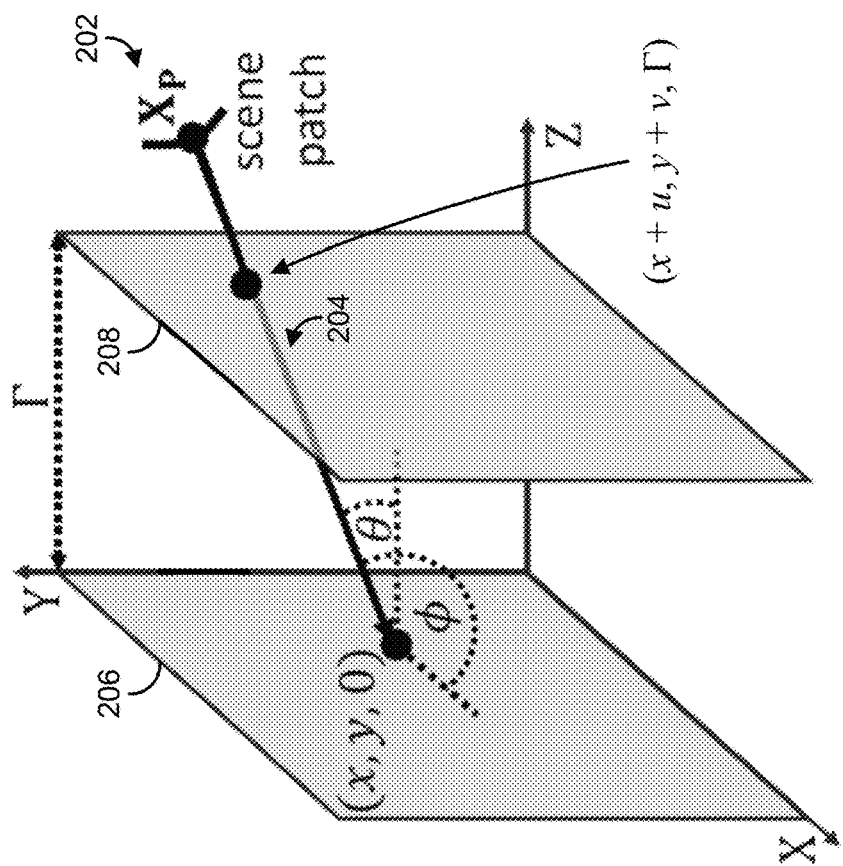
FIG. 2B
FIG. 2A

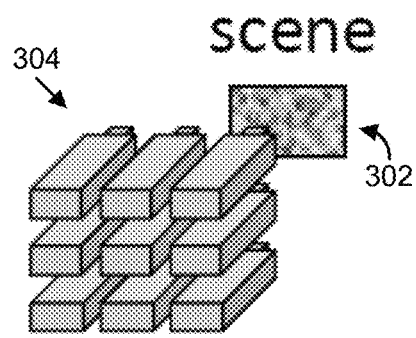
FIG. 3A
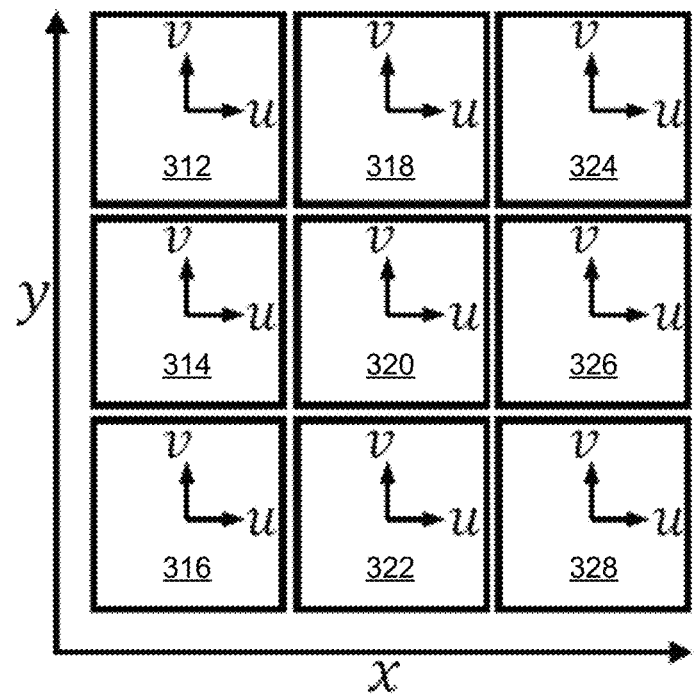
FIG. 3B
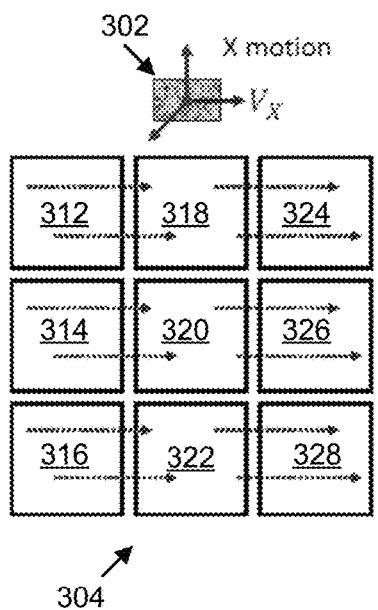
FIG. 3C1
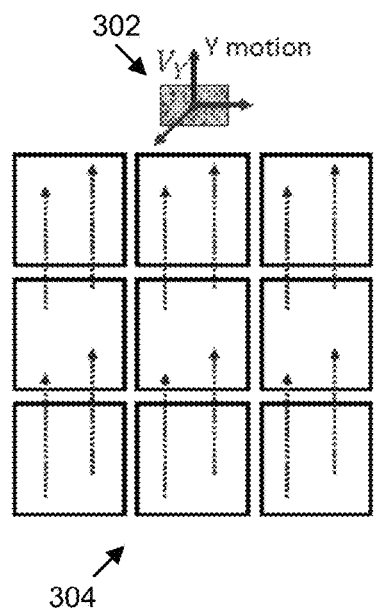
FIG. 3C2
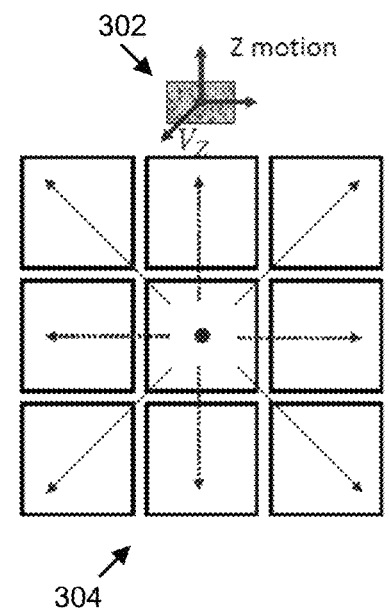
FIG. 3C3

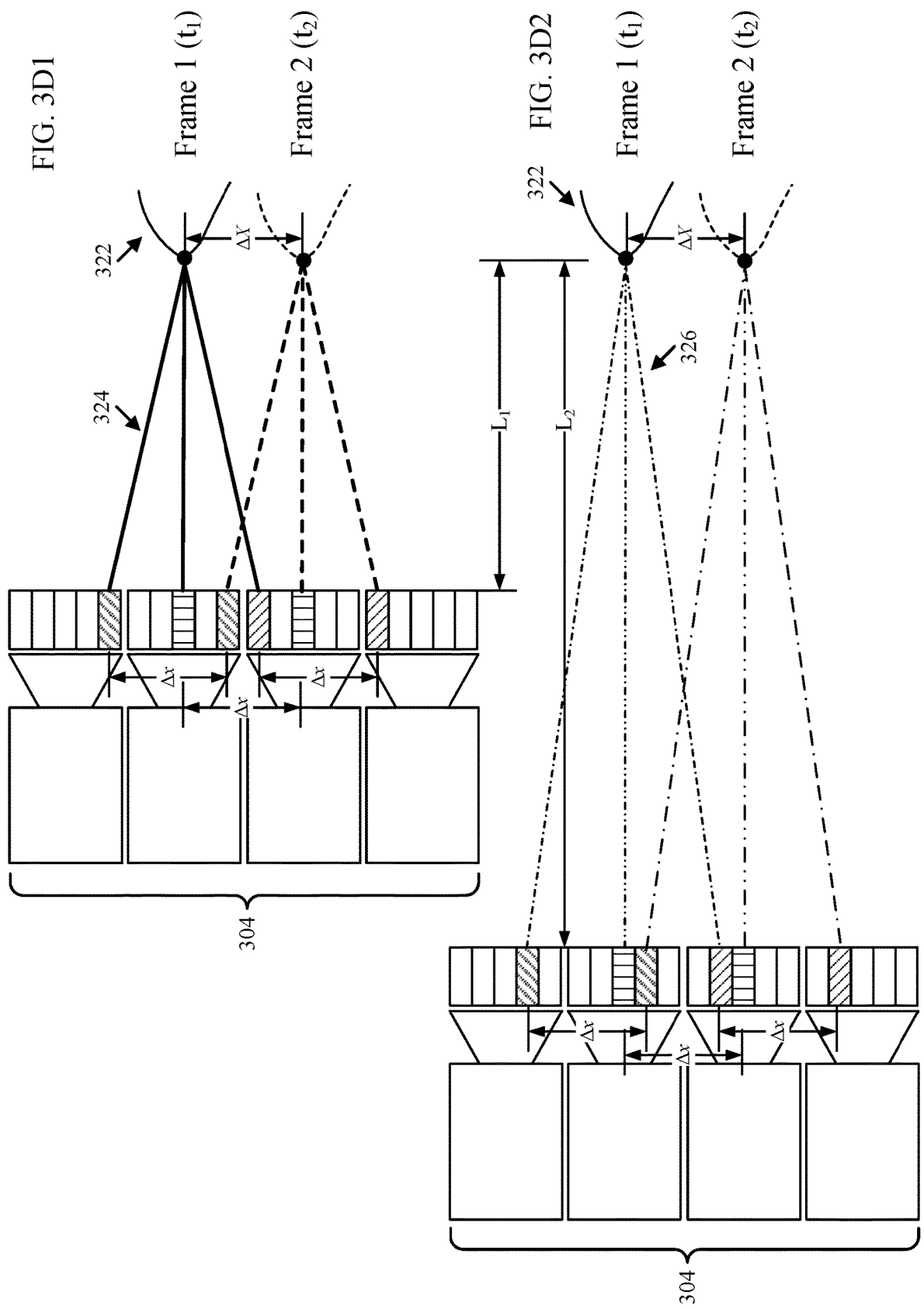

700

800

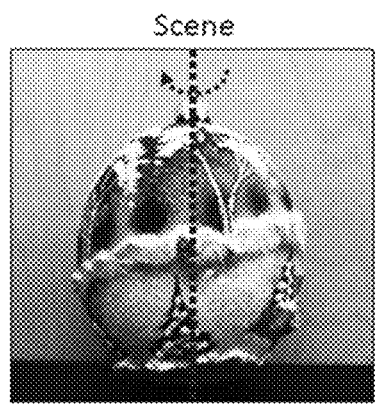
FIG. 14
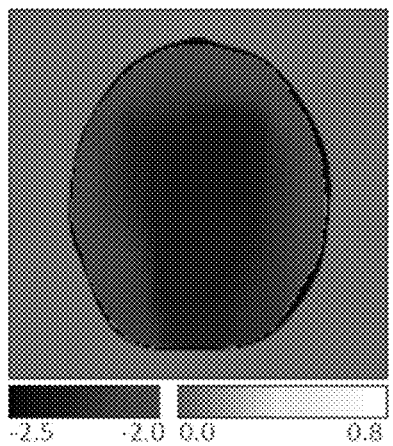 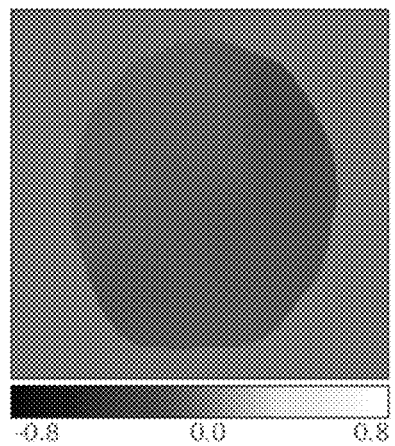 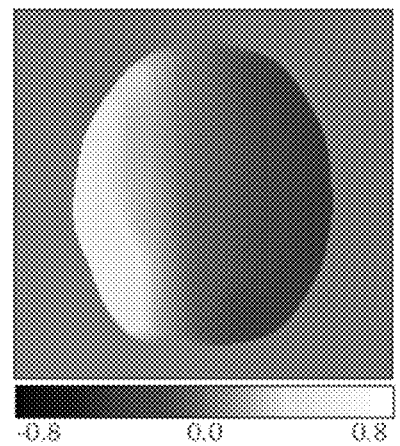
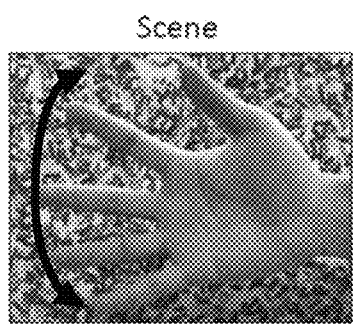
FIG. 15
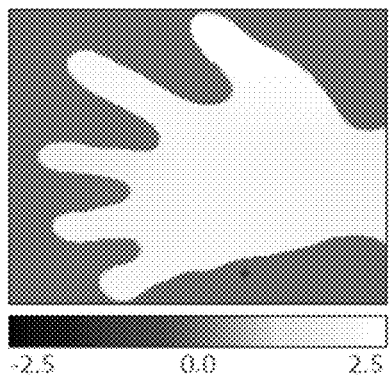 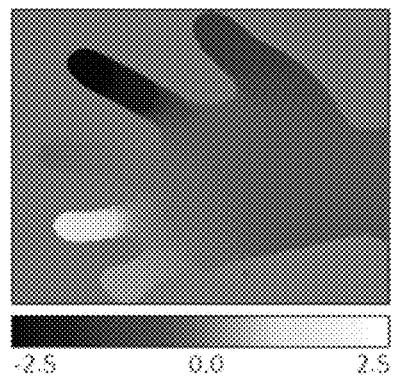 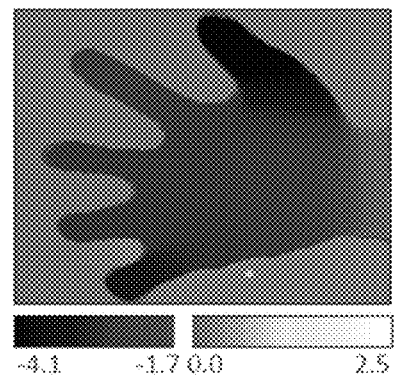

SYSTEMS, METHODS, AND MEDIA FOR DETERMINING OBJECT MOTION IN THREE DIMENSIONS FROM LIGHT FIELD IMAGE DATA

STATEMENT REGARDING FEDERALLY SPONSORED RESEARCH

This invention was made with government support under HR0011-16-C-0025 awarded by the DOD/DARPA and N00014-16-1-2995 awarded by the NAVY/ONR. The government has certain rights in the invention.

CROSS-REFERENCE TO RELATED APPLICATIONS

N/A

BACKGROUND

In recent years with advancements in digital imaging, image sensors have become more popular for measuring macroscopic motions in a scene in three dimensions. However, estimating small motions in three dimensions using image sensors remains a difficult problem. Measuring micro-motions at macroscopic stand-off distances is not possible with conventional cameras and vision systems without using sophisticated optics and/or special purpose light sources. Furthermore, measuring multi-object or non-rigid motion is fundamentally more challenging than tracking a single object due to the considerably higher number of degrees of freedom, especially if the objects are devoid of high-frequency texture.

One approach for attempting to measure motion is a combination of two dimensional (2D) optical flow and changes in scene depths (sometimes referred to as scene flow). In this approach, both optical flow and depths are calculated to attempt to measure scene motion. For example, depth can be calculated using stereo cameras or an RGB-D camera. As another example, light field cameras have been used for recovering depths for calculating scene flow Light field data has also been used for attempting to recover a camera's motion (i.e., ego-motion of the camera), and to compute three dimensional (3D) scene reconstructions via structure-from-motion techniques. These techniques are based on a constraint relating camera motion and light fields, and recover six degree-of-freedom camera motion from light fields, which is an over-constrained problem. However, these techniques are not suited to detecting object motion in a scene (e.g., by determining 3D non-rigid scene motion at every pixel), which is under-constrained due to considerably higher number of degrees of freedom.

Accordingly, systems, methods, and media for determining object motion in three dimensions from light field image data are desirable.

SUMMARY

In accordance with some embodiments of the disclosed subject matter, systems, methods, and media for determining object motion in three dimensions from light field image data are provided.

In accordance with some embodiments of the disclosed subject matter, a system for three dimensional motion estimation is provided, the system comprising: an image sensor; optics configured to create a plurality of images of a scene; and one or more hardware processors that are configured to: cause the image sensor to capture at least a first image of the scene at a first time; generate a first light field using a first plurality of images of the scene including the first image; cause the image sensor to capture at least a second image of the scene at a second time, wherein the second time is subsequent to the first time; generate a second light field using a second plurality of images of the scene including the second image; calculate light field gradients using information from the first light field and information from the second light field; and calculate, for each point in the scene, three dimensional motion using the light field gradients by applying a constraint to the motion in the scene.

In some embodiments, the optics comprises an array of microlenses disposed between the image sensor and focusing optics, and the plurality of images of the scene are sub-aperture images projected by the microlenses onto the image sensor.

In some embodiments, the one or more hardware processors are further configured to: generate, for each of a plurality of rays in the first light field, a first matrix A of light field gradients that includes light field gradients corresponding to rays in a local neighborhood of the ray, wherein A is an n×3 matrix where n is the number of rays in the local neighborhood; generate, for each of the plurality of rays in the first light field, a second matrix b of temporal light field derivatives that includes the additive inverses of temporal light field derivatives corresponding to the rays in the local neighborhood of the ray, wherein b is a n×1 matrix; calculate, for each of the plurality of rays, a three element velocity vector V, such that $V=(A^TA)^{-1}A^Tb$, where the local neighborhood of rays are assumed to have the same velocity; and calculate motion in the scene based on the velocity vector V calculated for each of the plurality of rays. In some embodiments, the one or more hardware processors are further configured to calculate, for each point in the scene, three dimensional motion by determining a k×3 velocity matrix V by finding a V that minimizes the relationship: $(L_0(x)-L_1(w(x, V)))^2$, where $L_0$ is the first light field, and $L_1$ is the second light field, and $w(x, V)$ is a warp function that is represented as $$w(x, V) = \left(x + V_X - \frac{u}{\Gamma}V_Z, y + V_Y - \frac{v}{\Gamma}V_Z, u, v\right), V_X, V_Y, \text{ and } V_Z$$

are the velocities in the X, Y, and Z directions respectively, x has coordinates (x, y, u, v), and r is the depth in the Z direction of the plane used to define the light field.

In some embodiments, the one or more hardware processors are further configured to find velocity vectors V for a plurality of light field coordinates that minimize a global functional E(V) that includes a smoothness term that penalizes departures from smoothness.

In some embodiments, the one or more hardware processors are further configured to find the velocity vectors V for the plurality of light field coordinates that minimize the global functional E(V) by solving a set of Euler-Lagrange equations using successive over-relaxation.

In some embodiments, the smoothness term includes a quadratic penalty functions $\lambda$ and $\lambda_Z$, where $\lambda_Z < \lambda$.

In some embodiments, the smoothness term includes a generalized Charbonier function $\rho(x)=(x^2+\varepsilon^2)^\alpha$.

In some embodiments, the one or more hardware processors are further configured to find a velocity V that minimizes a functional that includes: a local term ($E_D(V)$) that aggregates information from a plurality of rays emitted from the same scene point S that were detected in the first light field; and a smoothness term ($E_S(V)$) that penalizes departures from smoothness.

In accordance with some embodiments of the disclosed subject matter, a method for three dimensional motion estimation is provided, the method comprising: causing an image sensor to capture at least a first image of a scene at a first time, wherein the first image is formed on the image sensor via optics configured to create a plurality of images of the scene; generating a first light field using a first plurality of images of the scene including the first image; causing the image sensor to capture at least a second image of the scene at a second time, wherein the second time is subsequent to the first time and the second image is formed on the image sensor via the optics configured to create a plurality of images of the scene; generating a second light field using a second plurality of images of the scene including the second image; calculating light field gradients using information from the first light field and information from the second light field; and calculating, for each point in the scene, three dimensional motion using the light field gradients by applying a constraint to the motion in the scene.

In accordance with some embodiments of the disclosed subject matter, a non-transitory computer readable medium containing computer executable instructions that, when executed by a processor, cause the processor to perform a method for three dimensional motion estimation is provided, the method comprising: causing an image sensor to capture at least a first image of a scene at a first time, wherein the first image is formed on the image sensor via optics configured to create a plurality of images of the scene; generating a first light field using a first plurality of images of the scene including the first image; causing the image sensor to capture at least a second image of the scene at a second time, wherein the second time is subsequent to the first time and the second image is formed on the image sensor via the optics configured to create a plurality of images of the scene; generating a second light field using a second plurality of images of the scene including the second image; calculating light field gradients using information from the first light field and information from the second light field; and calculating, for each point in the scene, three dimensional motion using the light field gradients by applying a constraint to the motion in the scene.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2A shows an example representation of a light ray corresponding to a portion of a light field that is defined using a two-plane parametrization in accordance with some embodiments of the disclosed subject matter.

FIG. 2B shows an example representation of the light ray of FIG. 2A at a second point in time after motion of the object from which the light ray was emitted in accordance with some embodiments of the disclosed subject matter.

FIG. 3A shows a representation of a light field camera as a two-dimensional array of pinhole cameras that each captures a two-dimensional image.

FIG. 3B shows a representation of an array of two-dimensional sub-aperture images of a scene captured by a light field camera.

FIGS. 3C1 to 3C3 show representations of how motion in a scene affects the content of sub-aperture images of successive light fields in accordance with some embodiments of the disclosed subject matter.

FIGS. 3D1 and 3D2 show representations of the relationship between object distance, object movement in the scene, and ray movements across various sub-aperture images between frames in accordance with some embodiments of the disclosed subject matter.

FIG. 14 shows an example of a scene with a single rotating object, and detected motion in the scene calculated based on light fields captured at different times while the object rotates using techniques in accordance with some embodiments of the disclosed subject matter.

FIG. 15 shows an example of a scene with a non-rigid object moving in a complex manner, and detected motion in the scene calculated based on light fields captured at different times using techniques in accordance with some embodiments of the disclosed subject matter.

DETAILED DESCRIPTION

Figure 1:
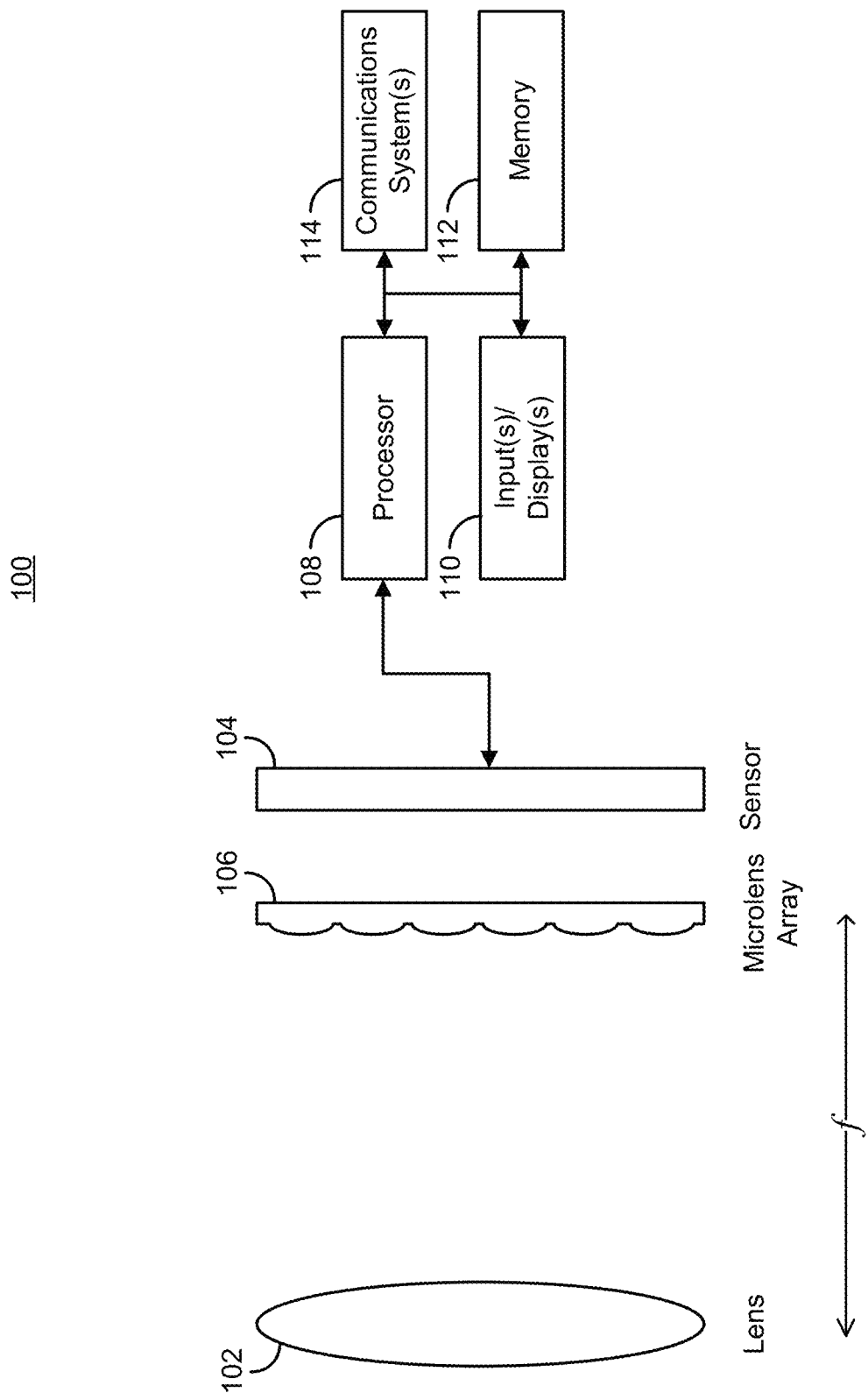
FIG. 1 shows an example of a system for determining object motion in three dimensions from light field image data in accordance with some embodiments of the disclosed subject matter.

In accordance with various embodiments, mechanisms (which can, for example, include systems, methods, and media) for determining object motion in three dimensions from light field image data are provided.

In some embodiments, the mechanisms described herein can determine motion of objects in a scene (e.g., the direction and magnitude of the motions) from light field image data captured of the scene at two points in time. In some embodiments, the mechanisms described herein can be used in many different applications, such as to measure dense (e.g., per-pixel) 3D scene motion for use with autonomous navigation, human-computer interfaces, augmented reality, virtual reality, 2D to 3D conversion, etc. For example, a head-mounted camera used with mechanisms described herein can be implemented to track the 3D motion of hands for manipulation of virtual objects in an augmented (or fully virtual) reality setting. As another example, the mechanisms described herein can be used with machine vision processes to attempt to determine a person's level of engagement by tracking subtle body movements. Such applications benefit from precise measurement of 3D scene motion.

In general, determining object motion directly from light fields is under-constrained, as the velocity (e.g., as represented by a three element vector) unknown for each point. In some embodiments, the mechanisms described herein use a constraint (sometimes referred to herein as the ray flow equation), which relates dense 3D motion field of a scene to gradients of the measured light field, as follows:

$$L_X V_X + L_Y V_Y + L_Z V_Z + L_t = 0$$

where $V_X$, $V_Y$, $V_Z$ are per-pixel 3D scene velocity components, $L_X$, $L_Y$, $L_Z$ are spatio-angular gradients of the four dimensional (4D) light field, and $L_t$ is the temporal light field derivative. In general, ray flow can be defined as local changes in the 4D light field, due to small, differential, 3D scene motion, and the ray flow equation is independent of the 3D scene structure. Accordingly, the ray flow equation can be used in connection with a general class of scenes.

In general, the ray flow equation has a form that is similar to the classical optical flow equation. For example, the ray flow equation is linear and under-constrained, with three unknowns ($V_X$, $V_Y$, $V_Z$) per equation (e.g., rather than two unknowns at each point in the 2D scene). Accordingly, it is not possible to recover the complete 3D motion vector from the ray flow equation without imposing further constraints. However, due to some structural similarities between the ray flow equation and optical flow equations, regularization techniques used to calculate 2D optical flow can be serve as inspiration for techniques to constrain ray flow. In some embodiments of the disclosed subject matter, ray flow based techniques for recovering 3D non-rigid scene motion directly from measured light field gradients can use similar assumptions to those used to recover 2D scene motion from image data.

In some embodiments of the disclosed subject matter, one or more techniques can be used to estimate 3D non-rigid scene motion using the ray flow equation. For example, local techniques can be used, which in general constrain motion calculations for objects in the scene by assuming that the velocity is constant in a local patch of light field image data. As another example, global techniques can be used, which in general constrain motion calculations for objects in the scene by assuming that the velocity in the scene varies smoothly. As yet another example, hybrid techniques combining local and non-local assumptions can be used. As described below, using the mechanisms described herein, 3D scene motion can be calculated with sub-millimeter precision along all three axes (i.e., X, Y, and Z), for a wide range of scenarios, including complex non-rigid motion.

In some embodiments, a light field structure tensor for a portion of a scene can be calculated to determine the space of scene motions that are recoverable for that portion of the scene. For example, the light field structure tensor can be a 3×3 matrix that encodes local light field structure. In such an example, the space of recoverable motions can be related to the properties (e.g., the rank and eigenvalues) of the light field structure tensor. As described below, the properties of the light field structure tensor are generally relates to texture in the scene.

In some embodiments, the accuracy and/or precision of motion recovery using ray flow techniques described herein can vary based on imaging parameters of the light field camera being used to capture the light fields. For example, as described below in connection with FIGS. 15A and 15B, the accuracy and/or precision can depend on one or more of the angular resolution of the light field camera, the aperture size, and the field of view.

FIG. 1 shows an example 100 of a system for determining object motion in three dimensions from light field image data in accordance with some embodiments of the disclosed subject matter. As shown, system 100 can include a lens 102; an image sensor 104; a microlens array 106; a processor 108 for controlling operations of system 100 which can include any suitable hardware processor (which can be a microprocessor, digital signal processor, a microcontroller, a GPU, etc.) or combination of hardware processors; an input device/display 110 (such as a shutter button, a menu button, a microphone, a touchscreen, a motion sensor, a liquid crystal display, etc., or any suitable combination thereof) for accepting input from a user and/or from the environment, and/or for presenting information (e.g., images, detected motion, etc.) for consumption by a user; memory 112; and a communication system or systems 114 for allowing communication between system 100 and other devices, such as a smartphone, a wearable computer, a tablet computer, a laptop computer, a personal computer, a server, etc., via a communication link. In some embodiments, memory 112 can store light field image data, light field gradients, one or more motion vector corresponding to objects in the scene, etc. Memory 112 can include a storage device (e.g., a hard disk, a Blu-ray disc, a Digital Video Disk, RAM, ROM, EEPROM, etc.) for storing a computer program for controlling processor 108. In some embodiments, memory 112 can include instructions for causing processor 108 to execute processes associated with the mechanisms described herein, such as processes described below in connection with FIGS. 5-7.

In some embodiments, image sensor 104 can be any suitable image sensor that can generate light field image data received from the scene via lens 102 and/or microlens array 106. For example, in some embodiments, image sensor 104 can be a CCD image sensor or a CMOS image sensor. In some embodiments, image sensor 104 can be a high speed image sensor that is configured to capture images at a frame rate substantially higher than thirty frames per second. For example, image sensor 104 can be configured to capture images a frame rate of at least 60 frames per second (fps). In some embodiments, image sensor 104 can be a monochrome sensor. Alternatively, in some embodiments, image sensor 104 can be a color sensor, which may reduce the amount of information captured in each light field due to reduced spatial resolution.

In some embodiments, system 100 can include additional optics. For example, although lens 102 is shown as a single lens, it can be implemented as a compound lens or combination of lenses. In some embodiments, microlens array 106 can be positioned at the focal plane of lens 102. Note that, although system 100 for capturing light field image data is shown with a single image sensor with a microlens array positioned between the image sensor and a focusing lens, this is merely an example, and light field image data can be captured using other arrangements. As another example, light field image data can be captured using an array of 2D cameras positioned at the focal plane of a large format (e.g., on the order of 1 meter) Fresnel lens.

In some embodiments, system 100 can communicate with a remote device over a network using communication system(s) 114 and a communication link. Additionally or alternatively, system 100 can be included as part of another device, such as a smartphone, a tablet computer, a laptop computer, etc. Parts of system 100 can be shared with a device within which system 100 is integrated. For example, if system 100 is integrated with a smartphone, processor 108 can be a processor of the smartphone and can be used to control operation of system 100. In one particular example, system 100 can be implemented as part of a commercially available light field camera, such as a LYTRO ILLUM (available from Lytro, Inc. headquartered in Mountain View, Calif.).

In some embodiments, system 100 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, security camera, outdoor monitoring system, a smartphone, a wearable computer, a tablet computer, a personal data assistant (PDA), a personal computer, a laptop computer, a multimedia terminal, a game console, a peripheral for a game counsel or any of the above devices, a special purpose device, etc.

Communications by communication system 114 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 100 and another device, such as a network link, a dial-up link, a wireless link, a hard-wired link, any other suitable communication link, or any suitable combination of such links. System 100 and/or another device (e.g., a server, a personal computer, a smartphone, etc.) can enable a user to execute a computer program that uses information derived using the mechanisms described herein to, for example, control a user interface.

It should also be noted that data received through the communication link or any other communication link(s) can be received from any suitable source. In some embodiments, processor 108 can send and receive data through the communication link or any other communication link(s) using, for example, a transmitter, receiver, transmitter/receiver, transceiver, or any other suitable communication device.

FIG. 2A shows an example representation of a light ray corresponding to a portion of a light field that is defined using a two-plane parametrization, and FIG. 2B shows an example of the light ray of FIG. 2A at a second point in time after motion of the object from which the light ray was emitted in accordance with some embodiments of the disclosed subject matter.

As shown in FIG. 2A, a patch 202 of a scene emits rays (e.g., light reflected off of objects in the scene), including a ray 204, toward the camera plane 206 (at Z=0) through a parallel plane 208 (at Z=Γ). The location of patch 202 can be described with reference to the camera plane. For example, a scene point P, corresponding to patch 202, can be referenced as being located at a 3D location $X_P=(X_P, Y_P,$ $Z_P$) in the scene. In such an example, a ray from P can be described as traveling from P to the imaging plane along a particular direction (θ, φ), which can represent the angles made by the unit direction vector with the Z and X axis, respectively. The radiance of P along direction (θ, φ) can be represented by the 5D function L($X_P$, θ, φ), which is sometimes referred to as the plenoptic function: it defines the radiance of all the scene points, along all possible ray directions. If it is assumed that the radiance does not change along a ray, the 5D function L($X_P$, θ, φ) can be simplified to a 4D function L(x, y, u, v) (which is sometimes referred to as the light field), in which each ray can be parameterized based on an intersection with parallel planes at Z=0 (the imaging plane) and Z=Γ (a parallel plane at a fixed distance Γ from the camera plane). As shown in FIG. 2A, ray 204 intersects the planes at points (x, y, 0) and (x+u, y+v, Γ), respectively. Accordingly, ray 204 can be represented by the coordinates (x, y, u, v). Note that (u, v) are relative coordinates that represent the differences in the X and Y coordinates of the two intersection points, not the absolute position at which the ray intersects the plane at Z=Γ. This is sometimes referred to as two-plane parameterization of a light field, and is a relatively common technique used to represent light fields captured by cameras.

In some embodiments, a relationship between the scene-centric coordinates (X, Y, Z, θ, φ) of a light ray, and camera-centric coordinates (x, y, u, v) of the light ray can be represented by the:

$x=X-Z \tan θ \cos φ, u=Γ \tan θ \cos φ$, $y=Y-Z \tan θ \sin φ, v=Γ \tan θ \sin φ$.  (1)

When an object in a scene (e.g., patch 202) moves between a first time t and a second time t+Δt, the position at time t can be represented in scene-centric coordinates as $X_P$(e.g., as described above), and the position at time t+Δt can be represented as $X'_P = X_P + ΔX_P$, where $ΔX_P = (ΔX_P, ΔY_P, ΔZ_P)$ can represent a small (differential) 3D motion between the two moments in time. As shown in FIG. 2B, ray 214 emitted from patch 202 at $X'_P$ can represent a ray emitted from patch 202 after movement represented by $ΔX_P$. If it is assumed that patch 202 containing P only translates during motion (e.g., does not rotate), then ray 214 is parallel to ray 204 such that coordinates (u, v) for rays emitted from P remain constant. In such an example, the coordinates of ray 204 before motion can be represented as (x, y, u, v) and the coordinates of ray 214 after motion can be represented as (x+Δx, y+Δy, u, v). Additionally, if it is assumed that the ray brightness remains constant during motion, the light field at time t+Δt can be represented by the relationship:

$L(x,y,u,v,t)=L(x+Δx,y+Δy,u,v,t+Δt)$.  (2)

Note that, although this example is described under the assumption that the objects in the scene do not rotate, the techniques described herein can detect some rotational motion (e.g., as described below in connection with FIGS. 13 and 19) of objects with a locally smooth patch bidirectional reflectance distribution function. There are some similarities between the assumption that ray brightness remains constant during motion and the scene brightness constancy assumption often relied on optical flow calculation techniques.

In some embodiments, ray flow can be calculated based on the change (Δx, Δy) in the ray's coordinates due to scene motion between a first light field and a second light field. Ray flow can be related to light field gradients can be related can be combined in one relationship with light field gradients $$\left(\frac{\partial L}{\partial x}, \frac{\partial L}{\partial y}, \frac{\partial L}{\partial t}\right)$$

using the following relationship, which is a first-order Taylor series expansion of EQ. 2:

$$\frac{\partial L}{\partial x}Δx + \frac{\partial L}{\partial y}Δy + \frac{\partial L}{\partial t}Δt = 0. \quad (3)$$

From EQ. 1, ray flow can also be related to scene motion using the following relationships:

$$Δx = \frac{\partial x}{\partial X}ΔX + \frac{\partial x}{\partial Z}ΔZ = ΔX - \frac{u}{Γ}ΔZ, \quad (4)$$

$$Δy = \frac{\partial y}{\partial Y}ΔY + \frac{\partial y}{\partial Z}ΔZ = ΔY - \frac{v}{Γ}ΔZ.$$

If EQ. 4 is substituted into EQ. 3, EQ. 3 can be expressed as:

$L_X V_X + L_Y V_Y + L_Z V_Z + L_t = 0$,  (5)

where $$L_X = \frac{\partial L}{\partial x}, L_Y = \frac{\partial L}{\partial y}, L_t = \frac{\partial L}{\partial t}, \text{ and } L_Z = -\frac{u}{Γ}\frac{\partial L}{\partial x} - \frac{v}{Γ}\frac{\partial L}{\partial y},$$

represent light field gradients, and $$V = (V_X, V_Y, V_Z) = \left(\frac{ΔX}{Δt}, \frac{ΔY}{Δt}, \frac{ΔZ}{Δt}\right)$$

represents the velocities (i.e., magnitude and direction of movement) of points in the scene between two light fields (e.g., captured at t and t+Δt, respectively). As described above in connection with EQ. 1, this is sometimes referred to herein as the ray flow equation, and it relates 3D scene motion and measured light field gradients.

FIG. 3A shows a representation of a light field camera as a two-dimensional array of pinhole cameras that each captures a two-dimensional image. As shown in FIG. 3A, light field image data (e.g., image data that can be used to compute a light field) of a scene 302 can be represented as images output by an array 304 of pinhole cameras directed toward scene 302. As shown, due to the offset in space of the different pinhole cameras, each camera captures scene 302 from a slightly different angle, resulting in images that would appear similar to a viewer. These images are sometimes referred to as sub-aperture images, and the information from the sub-aperture images can be used to calculate a light field that represents multiple rays emitted in different directions from the same point (e.g., point P) in the scene. Note that a 2D image sensor that captures a single image (e.g., as used in many conventional digital imaging devices) generally records information about only one ray emitted from each scene point (e.g., rays emitted from the scene in a direction parallel to an optical axis of the imaging device when the focus at infinity).

FIG. 3B shows a representation of an array of two-dimensional sub-aperture images of a scene captured by a light field camera. As shown, many sub-aperture images 312-328 can be formed at the image plane (e.g., the x/y plane in FIG. 3B), and the coordinates within each sub-aperture image can be described using both the position on the x/y plane of the image sensor(s), and the pixel indices within the individual sub-aperture images can be represented by coordinates (u, v) that correspond to the relative coordinates described above in connection with EQ. 1. A light field captured by the array of cameras in FIG. 3A as the array of sub-aperture images 312-328 can be represented as a 4D light field as described above in connection with FIG. 2A (e.g., using the function L(x, y, u, v)).

FIGS. 3C1 to 3C3 show representations of how motion in a scene affects the content of sub-aperture images of successive light fields in accordance with some embodiments of the disclosed subject matter. As shown in FIGS. 3C1 to 3C3, ray flows due to different types of scene motion (e.g., lateral or axial) exhibit qualitative differences. For example, as shown in FIGS. 3C1 and 3C2, horizontal or vertical lateral motion of an object along the X/Y directions (represented as $V_X$ or $V_Y$), causes the same rays (i.e., rays emitted from the same scene point at the same angle) to shift horizontally or vertically, respectively, across sub-aperture images 312-328. Note that horizontal and lateral merely refer to the orientation of FIG. 3C1, the designation of x as horizontal and y as vertical is merely used for convenience and does not imply a specific direction of lateral motion in a scene for which motion is being calculated. As described above in connection with FIGS. 2A and 2B, the amount of shift ($\Delta x$, $\Delta y$) is independent of the ray's original coordinates, which can also be appreciated from EQ. 4. That is, the lateral shift of the ray across the sub-aperture images is dependent on the amount and direction of motion of the object, not where the object started.

As another example, as shown in FIG. 3C3, axial motion of an object along the Z direction (represented as $V_Z$), rays from the object shift radially across sub-aperture images, where the amount of shift does depend on the ray's original (u, v) coordinates, which can also be appreciated from EQ. 4. In a more particular example, rays at the center of each sub-aperture image (u=0, v=0) do not shift. However, rays retain the same pixel index (u, v) after the motion, but appear in a different sub-aperture image (x, y), as scene motion results in rays translating parallel to themselves.

FIGS. 3D1 and 3D2 show representations of the relationship between object distance, object movement in the scene, and ray movements across various sub-aperture images between frames in accordance with some embodiments of the disclosed subject matter. FIG. 3D1 shows a scene object 322 that is a distance $L_1$ from array 304 translating along the X direction by an amount $\Delta X$ from time $t_1$ to time $t_2$, and shows rays 324 translating by an amount $\Delta x$. FIG. 3D2 shows scene object 322 a distance $L_2$ from array 304, where $L_2 \gg L_1$, similarly translating along the X direction by the same amount $\Delta X$ from time $t_1$ to time $t_2$, and shows rays 326 similarly translating by the same amount $\Delta x$, despite the increased distance between object 322 and array 304. As shown in FIGS. 3D1 and 3D2, the amount $\Delta x$ by which the rays shift is related to the actual distance $\Delta X$ that object 322 traveled, which facilitates calculation of $\Delta X$ directly from the light field image data, without determining the depth or 3D position of the scene point. For example, in contrast to conventional motion estimation techniques in which depth and motion estimation are coupled together, and thus, need to be calculated simultaneously, scene motion can be encoded in, and recoverable from, only the light field gradients. That is, the ray flow equation can decouple depth and motion estimation, which can have important practical implications. For example, 3D scene motion can be directly recovered from the light field gradients, without explicitly recovering scene depths, potentially avoiding errors due to the intermediate depth estimation step. This can be especially helpful when estimating small axial motions (i.e., along the Z direction) from image data, as conventional depth estimation generally has a relatively low degree of precision. Note that, although motion estimation via ray flow does not require depth estimation, the accuracy of motion recovery techniques described herein can depend on the scene depth. As an extreme example, if the object is at infinity, it is impossible to compute light field gradients as all sub-aperture images would be identical for that object, and thus, motion cannot be recovered.

Figure 4:
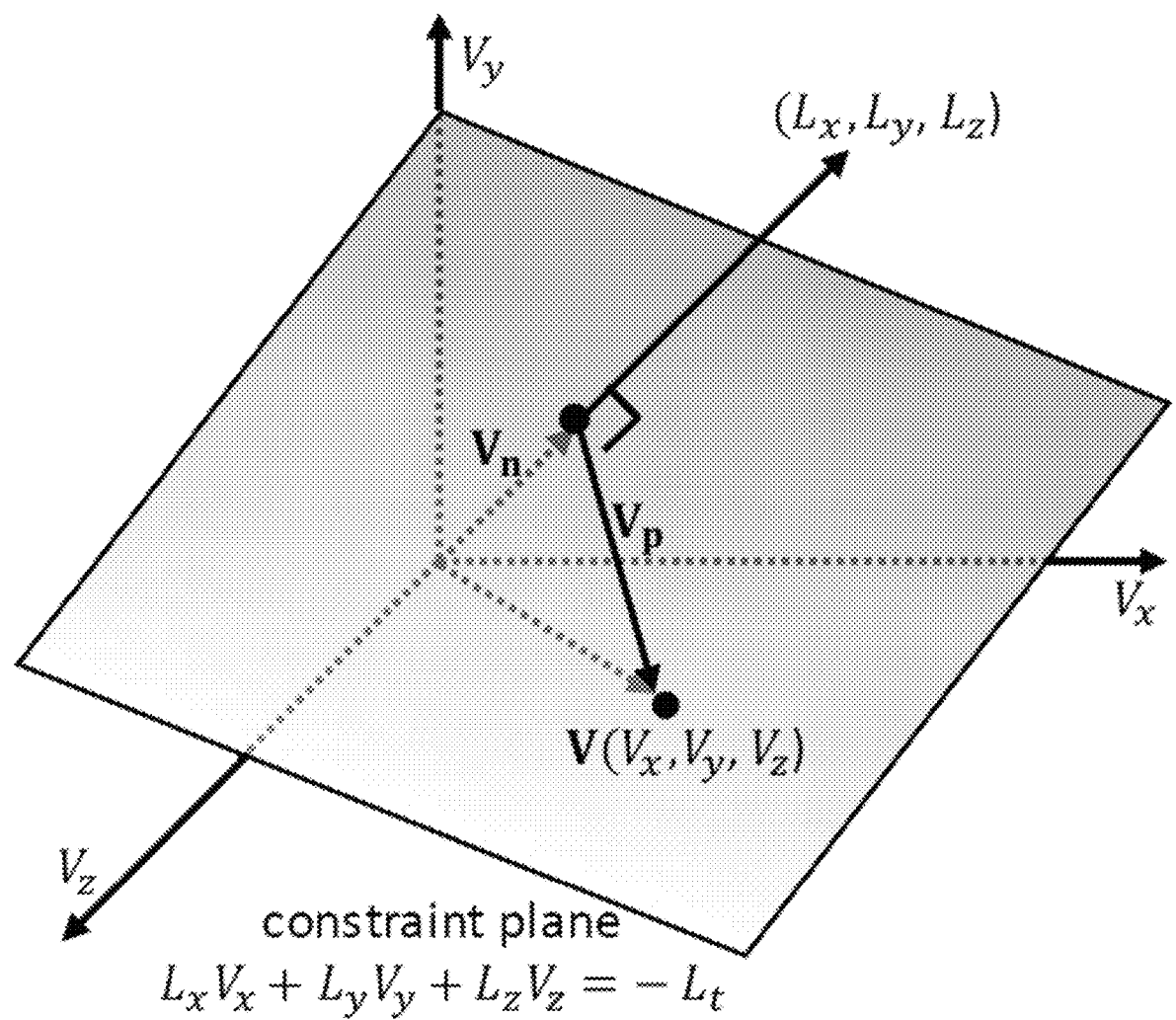
FIG. 4 shows a graphical representation of components of a ray flow equation in accordance with some embodiments of the disclosed subject matter.

FIG. 4 shows a graphical representation of components of a ray flow equation in accordance with some embodiments of the disclosed subject matter. As shown in FIG. 4, velocities can be represented as a three-dimensional space with axes $V_X$, $V_Y$, and $V_Z$, which is sometimes referred to as motion space. The ray flow equation can define a plane in motion space with a normal vector $N_L=(L_X, L_Y, L_Z)$, as shown in FIG. 4. Additionally, the motion vector $V=(V_X, V_Y, V_Z)$ corresponding to each ray can be decomposed into two components: a recoverable normal flow $V_n$ (i.e., component along the plane normal), and an unrecoverable parallel flow $V_p$ (i.e., parallel to the plane). For example, the ray flow equation can be written as: $N_L \cdot (V_n+V_p)=-L_t$, where ($\cdot$) is the dot-product operator. Because $N_L \cdot V_p=0$, this can be re-written as: $N_L \cdot V_n=-L_t$. Accordingly, only the normal motion component can be recovered from a single ray flow equation, which can be referred to as the ray flow aperture problem.

In order to estimate motion in the scene without directly calculating the parallel component, additional assumptions can be made to further constrain the problem. This has some similarities to the aperture problem in 2D optical flow, where the optical flow equation $I_x u_x+I_y v_y+I_t=0$ is also under-constrained, with one equation having two unknowns ($u_x$, $u_y$). However, while both ray flow and optical flow are under-constrained linear equations, there are also important differences. Table 1, below shows a comparison of some of the similarities and differences between ray flow and optical flow.

In general, there are multiple families of differential ray flow techniques, based on the additional constraints imposed for regularizing the problem. For example, a first family of techniques are local techniques (e.g., techniques similar to Lucas-Kanade techniques for optical flow that can be adapted to ray flow), which assume that the flow is constant within small neighborhoods. As another example, a second family of techniques are global techniques (e.g., techniques similar to Horn-Shunck techniques for optical flow that can be adapted to ray flow), which assume that the flow varies smoothly across the scene.

TABLE 1

| Optical Flow | Ray Flow |
|---|---|
| Linear equation: $I_x u_x + I_y v_y + I_t = 0$ | Linear equation: $L_X V_X + L_Y V_Y + L_Z V_Z + L_t = 0$ |
| Coefficients: Image gradients: ($I_x$, $I_y$, $I_t$) | Coefficients: Light field gradients: ($L_X$, $L_Y$, $L_Z$, $L_t$) |
| 2 unknowns per pixel: Pixel motion ($u_x$, $v_y$) | 3 unknowns per pixel: Scene motion ($V_X$, $V_Y$, $V_Z$) |

TABLE 1-continued

| Optical Flow | Ray Flow |
| --- | --- |
| Motion ($u_x$, $v_y$) computed in 2D image space (pixels) | Motion ($V_X$, $V_Y$, $V_Z$) computed in 3D scene space |
| Gradients ($I_x$, $I_y$) defined on 2D image grid | Gradients ($L_X$, $L_Y$, $L_Z$) defined on 4D light field grid |
| $u_x$ and $v_y$ flow computations are symmetric | X/Y and Z flow computations are asymmetric |
| Size of structure tensor: 2 × 2 | Size of structure tensor: 3 × 3 |
| Possible ranks of structure tensor: [0, 1, 2] | Possible ranks of structure tensor: [0, 2, 3] |

Figure 5:
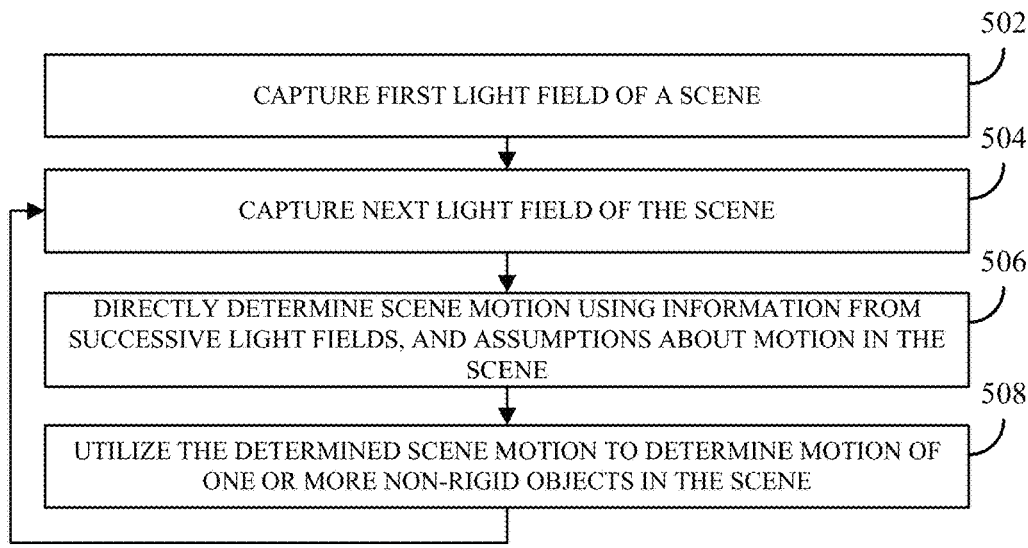
FIG. 5 shows an example of a process for determining object motion in three dimensions from light field image data in accordance with some embodiments of the disclosed subject matter.

FIG. 5 shows an example 500 of a process for determining object motion in three dimensions from light field image data in accordance with some embodiments of the disclosed subject matter. As shown, at 502, process 500 can capture a first light field of a scene using any suitable technique or combination of techniques. For example, process 500 can capture a light field using a light field imaging device, such as device 100. As another example, process 500 can capture a light field using multiple devices (e.g., an array of image sensors and/or cameras).

At 504, process 500 can capture another light field of the scene at a subsequent time. For example, if the first light field was captured at time $t_1$ at 502, a next light field can be captured at time at time $t_2=t_1+\Delta t$. In some embodiments, $\Delta t$ can be set at any suitable amount of time, which may depend on the speed at which objects in the scene are expected to move. For example, $\Delta t$ can be set at about 1/60 of a second (~16.6 milliseconds (ms)) for many scenes, which corresponds to a frame rate of 60 fps. This example $\Delta t$ can be an appropriate frame rate for many applications (e.g., tracking the motion of a user's digits, tracking the motion of humans in a relatively static scene, etc.). In a more particular example, frames captured a 60 fps can be used to provide relatively accurate velocities for object motions on the order of zero to one-half meter/second (m/s). Note that the particular object speeds for which relatively accurate results can be obtained may depend on implementation details of the imaging device(s) used to capture the images. As another example, images captured at higher frame rates (e.g., 120 fps, 150 fps, etc.) can be used to calculate velocities of objects that are expected to move relatively quickly. In general, the amount that an object moves between frames is inversely proportional to the frame rate. For example, an object moving 0.3 m/s would be expected to move the same amount (in space) in 1/60 of a second as an object moving at 0.6 m/s would be expected to move in 1/120 of a second. Accordingly, capturing a scene at 120 fps can produce relatively accurate velocities for objects moving somewhat more quickly (e.g., up to about 1 m/s) but may also increase costs/or noise (e.g., all else being equal, doubling the frame rate decreases the amount of light available for imaging by half, which may increase noise in the image due to amplification of the signal, reduction in signal to noise ratio, etc.).

At 506, process 500 can directly determine (e.g., without also determining depths) scene motion using information from two light fields (e.g., the light field captured at 502 and the light field captured at 504). In some embodiments, process 500 can use any suitable technique or combination of techniques to determine scene motion from the light field information. For example, as described below in connection with FIG. 6, process 500 can use one or more techniques that operate based on the assumption that motion within a local neighborhood of each ray is constant, which are sometimes referred to as local ray flow techniques. As another example, as described below in connection with FIG. 7, process 500 can use one or more techniques that operate based on the assumption that motion across the light scene varies smoothly, which are sometimes referred to as global ray flow techniques. As yet another example, process 500 can use one or more techniques that operate based on different assumptions for different portions of the scene, which are sometimes referred to as hybrid ray flow techniques.

At 508, process 500 can use the scene motion determined at 506 to determine motion of one or more non-rigid objects in the scene. In some embodiments, process 500 can use any suitable technique or combination of techniques to determine movements of individual objects. For example, process 500 can determine movements of individual objects using object recognition techniques to identify objects from image data, and determining a correspondence between the image data and the scene motion determined at 506. As another example, process 500 can use group portions of the scene that are moving at the same velocity, and identify that portion of the scene as corresponding to a particular object. As yet another example, process 500 can receive user input identifying a portion of the scene as corresponding to an object of interest, and process 500 can determine the motion of the object of interest based on the user input. Note that, depending on the purpose for which the motion information is to be used, process 500 can use different techniques for determining the motions of individual objects. For example, identifying and tracking movements of certain types of scene objects, such as a person or a vehicle, etc., may be important in some applications, such as applications where the motion information is used to predict future behaviors of the objects (e.g., determining scene motion for machine vision applications that can be used to control operations of an autonomous or semiautonomous vehicle). As another example, identifying and tracking movements of certain types of scene objects may be unimportant for some applications, such as applications that use certain movement signals as input to control a user interface. In such an example, identifying movements of particular objects may be less important than determining the magnitude and direction of multiple movements within the scene, which can be used to control the user interface. In a more particular example, a light field camera used as an input device for tracking hand movements may calculate the magnitude and direction of movements in the scene without identifying the movements with a particular body part(s).

Figure 6:
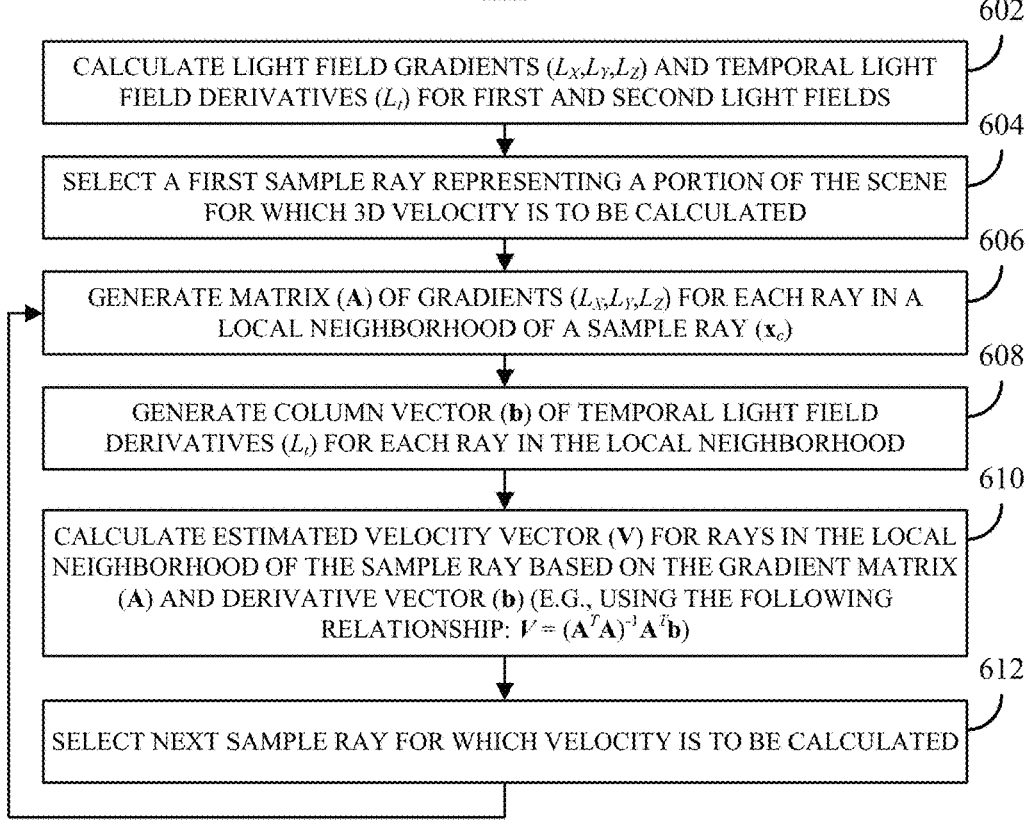
FIG. 6 shows an example of a process for calculating object motion between two light fields using local ray flow techniques in accordance with some embodiments of the disclosed subject matter.

FIG. 6 shows an example 600 of a process for calculating object motion between two light fields using local ray flow techniques in accordance with some embodiments of the disclosed subject matter. Local ray flow-based 3D motion recovery techniques, inspired by Lucas-Kanade optical flow techniques, can operate based on the assumption that the velocity V is constant in local 4D light field windows. As shown in FIG. 6, at 602, process 600 can calculate light field gradients (e.g., ($L_X$, $L_Y$, $L_Z$)) and temporal light field derivatives (e.g., ($L_t$)) for rays in the light fields. For example, ($L_X$, $L_Y$, $L_Z$) can be calculated for both the first and second light fields, and averaged to yield gradients to be used for analysis, while ($L_t$) can be calculated based on the difference between the two light fields.

At 604, process 600 can select a first ray $x_c$ representing a portion of the scene for which 3D velocity is to be calculated, where $x_c$ can be represented with coordinates $x_c=(x, y, u, v)$ as described above in connection with FIG. 2. The velocity of the local neighborhood can be determined by stacking ray flow equations (e.g., EQ. 5) for all the rays in a local neighborhood of $x_c$ (e.g., $x_i \in \mathcal{N}(x_c)$, where $\mathcal{N}(x_c)$ denotes a local neighborhood of the point x) a linear system relating velocity of the neighborhood and the measured light field gradients can be represented as AV=b, where A is an n×3 matrix representing gradients ($L_X$, $L_Y$, $L_Z$) for each ray in a local neighborhood of the ray $x_c$, V is the unknown velocity vector of the local neighborhood, and b is a column vector (i.e., an n×1 matrix) representing the additive inverse of each temporal light field derivative ($L_t$) (i.e., ($-L_t$) for each ray). In some embodiments, the neighborhood can include rays corresponding to any suitable coordinates around $x_c$, such as coordinates that are within the window ($x\pm\Delta x$, $y\pm\Delta y$, $u\pm\Delta u$, $v\pm\Delta v$) where $x_c$ has coordinates (x, y, u, v). For example, the neighborhood can include rays corresponding to the coordinates that fall within ($x\pm4$, $y\pm4$, $u\pm10$, $v\pm10$). In such an example, the calculation of the velocity of $x_c$ can include about 36,000 rays. Note that this is merely an example, and any suitable values can be used to define the neighborhood, such that the calculation of the velocity involves on the order of tens of thousands of rays.

In some embodiments, process 600 can use any suitable technique or combination of techniques to select rays, for example, based on the position at which the ray intersects the image sensor (e.g., which sub-aperture image the ray is represented in, and which pixel(s) within the sub-aperture image the ray corresponds to). Additionally or alternatively, multiple rays can be evaluated in parallel. For ray At 606, process 600 can generate matrix A using gradients ($L_X$, $L_Y$, $L_Z$) for each ray in a local neighborhood of the ray $x_c$, and at 608, process 600 can generate an n element column vector b using temporal light field derivatives ($L_t$) for ray $x_c$ and each ray in the local neighborhood of ray $x_c$. Matrices A and b can have the following forms:

$$A = \begin{bmatrix} L_X(x_1) & L_Y(x_1) & L_Z(x_1) \\ L_X(x_2) & L_Y(x_2) & L_Z(x_2) \\ \vdots & \vdots & \vdots \\ L_X(x_n) & L_Y(x_n) & L_Z(x_n) \end{bmatrix}, b = \begin{bmatrix} -L_t(x_1) \\ -L_t(x_2) \\ \vdots \\ -L_t(x_n) \end{bmatrix}.$$

At 610, process 600 can calculate an estimated velocity V using the following relationship:

$$V = (A^T A)^{-1} A^T b, \quad (6)$$

where V is a 3×1 vector representing the velocity along each direction for the entire neighborhood. The calculated velocity for each ray can then be combined to determine scene motion. In some embodiments, as described below in more detail, $A^T A$ can be used to characterize the local structure of the light field, and can be referred to as the structure tensor S, where $S = A^T A$.

$$S = \begin{bmatrix} \sum_{i=1}^{n} L_{X_i}^2 & \sum_{i=1}^{n} L_{X_i} L_{Y_i} & \sum_{i=1}^{n} L_{X_i} L_{Z_i} \\ \sum_{i=1}^{n} L_{Y_i} L_{X_i} & \sum_{i=1}^{n} L_{Y_i}^2 & \sum_{i=1}^{n} L_{Y_i} L_{Z_i} \\ \sum_{i=1}^{n} L_{Z_i} L_{X_i} & \sum_{i=1}^{n} L_{Z_i} L_{Y_i} & \sum_{i=1}^{n} L_{Z_i}^2 \end{bmatrix}, \quad (7)$$

Note that, in order to estimate motion using EQ. 6, S must be invertible.

At 612, process 600 can select a next sample ray $x_{c+1}$, and return to 606 to determine a velocity for ray $x_{c+1}$. When velocities are calculated for each ray in the light field, process 600 can terminate, and scene motion can be can be used to calculate object motions.

Note that if the inter-frame scene motion is relatively large, the simple linear ray flow equation may not produce valid results using the techniques described above. Accordingly, other techniques can be used, such as relating the scene motion and the resulting change in the captured light field by defining a warp function on the light field, which describes the change in coordinates x=(x, y, u, v) of a light ray due to scene motion V, where the warp function can be represented as:

$$w(x, V) = \left(x + V_X - \frac{u}{\Gamma} V_Z, y + V_Y - \frac{v}{\Gamma} V_Z, u, v\right). \quad (8)$$

Figure 7:
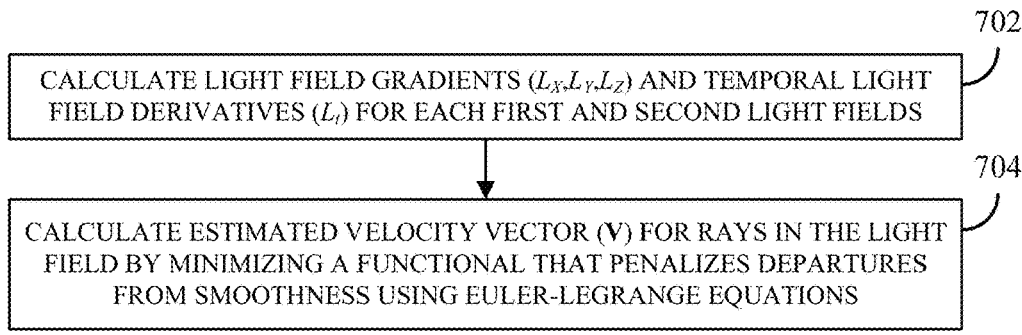
FIG. 7 shows an example of a process for calculating object motion between two light fields using global ray flow techniques in accordance with some embodiments of the disclosed subject matter.

The local technique can be re-characterized as a local light field registration problem, which can be represented as:

$$\min_{V} \sum_{x_i \in N(x_c)} (L_0(x_i) - L_1(w(x_i, V)))^2, \quad (9)$$

where V is the velocity of point x, $L_0$ is the light field at time t, and $L_1$ is the light field at time $t+\Delta t$. Note that, EQ. 6 is a particular case of EQ. 9 that can be derived by locally linearizing EQ. 9 and setting the gradient of the objective function to zero. For example, the derivative of EQ. 6 can be described as the derivative of EQ. 9. Using this formulation, the motion matrix V for all points in the scene can be solved over a light field pyramid for dealing with large (non-differential) scene motions. For example, the light field image data can be down-sampled to create lower resolution light fields, and a V can be calculated that minimizes EQ. 9 for the lower resolution fields. This initial motion matrix can be up-sampled and used as a starting point to calculate a V that minimizes EQ. 9 for higher resolution light fields. This can be iteratively performed until a V that minimizes EQ. 9 for the original resolution light fields is found. Such an example can be described as an iterative numerical method to solve for V. FIG. 7 shows an example 700 of a process for calculating object motion between two light fields using global ray flow techniques in accordance with some embodiments of the disclosed subject matter. For some scenes, local constancy assumptions described above in connection with local ray flow techniques may be too restrictive, for example, when the scene includes a relatively large amount of non-rigid motion. Accordingly, another family of techniques, inspired by global 'Horn-Schunck' optical flow techniques, can operate based on the assumption that the 3D motion field varies smoothly over the scene. In such techniques, the motion computation can be regularized by introducing a smoothness term that penalizes departure from smoothness, which can be and solved for the motion in the scene by minimizing a global functional that can be represented as:

$$E(V) = \underbrace{E_C(V)}_{\text{Error Term}} + \underbrace{E_S(V)}_{\text{Smoothness Term}}, \text{ where} \quad (10)$$

-continued $$E_C(V) = \int_\Omega (L_X V_X + L_Y V_y + L_Z V_Z + L_t)^2 dx,$$

$$E_S(V) = \int_\Omega (\lambda |\nabla V_X|^2 + \lambda |\nabla V_Y|^2 + \lambda_Z |\nabla V_Z|^2) dx.$$

Note that, in EQ. 10, $\Omega$ is the 4D light field domain, and $\nabla p$ is the 4D gradient of a scalar field PG $$p: \nabla p = \left( \frac{\partial p}{\partial x}, \frac{\partial p}{\partial y}, \frac{\partial p}{\partial u}, \frac{\partial p}{\partial v} \right).$$

Additionally, E(V) is a convex functional, and its minimum can be found using Euler-Lagrange equations, as described below in more detail.

Note that, as described herein, $L_Z$ is a linear combination of $L_X$ and $L_Y$. For a light field camera with a realistic FOV, this typically makes $L_Z$ smaller than $L_X$, $L_Y$. Accordingly, if the same $\lambda$ is used for Z-motion as X/Y-motion, the smoothness term for Z-motion will dominate the error term for Z-motion, resulting in over-smoothed Z-motion estimates. Therefore, a different $\lambda$, $\lambda_Z < \lambda$ can be used for Z-motion. The weights of the smoothness terms ($\lambda$, $\lambda_Z$) can be set to any suitable values, such as (8,1), where the ratio of $\lambda$ to $\lambda_Z$ is greater than one due to the smaller magnitude of $L_Z$ compared to $L_X$ and $L_Y$.

At 702, process 700 can calculate light field gradients (e.g., ($L_X$, $L_Y$, $L_Z$)) and temporal light field derivatives (e.g., ($L_t$)) for rays in the first light field.

At 704, process 700 can calculate an estimated velocity vector for rays in the scene by minimizing a functional that penalizes departures from smoothness using Euler-Lagrange equations, such as by minimizing E(V). For example, the minimum can be found by solving Euler-Lagrange equations of the form:

$$L_X(L_X V_X + L_Y V_y + L_Z V_Z) - \lambda \Delta V_X = -L_X L_t$$

$$L_Y(L_X V_X + L_Y V_y + L_Z V_Z) - \lambda \Delta V_y = -L_Y L_t$$

$$L_Z(L_X V_X + L_Y V_y + L_Z V_Z) - \lambda_Z \Delta V_Z = -L_Z L_t \quad (11)$$

For example, these equations can be discretized as a sparse linear system, and solved using Successive Over-Relaxation (SOR).

Note that the quadratic penalty functions used in EQ. 10 penalizes motion discontinuities, which may cause over-smoothing around motion boundaries. In some embodiments, a robust penalty function can be used, which can perform significantly better around motion discontinuities. For example, in some embodiments, the generalized Charbonier function $\rho(x)=(x^2+\epsilon^2)^\alpha$ with a=0.45 can be used as a penalty function, rather than the quadratic penalty function of EQ. 10.

Additionally or alternatively, in some embodiments, global ray flow techniques can be based on minimizing a modified energy E'(V), that can be represented as:

$$E_C(V) = \int_\Omega \rho_D((L_0(x) - L_1(w(x,V))^2) dx, \text{ and} \quad (12)$$

$$E_S(V) = \int_\Omega g(x)(\lambda \Sigma_{i=1}^4 \rho_S(V_{X(i)}^2) + \lambda \Sigma_{i=1}^4 \rho_S(V_{Y(i)}^2) + \lambda_Z \Sigma_{i=1}^4 \rho_S(V_{Z(i)}^2)) dx \quad (13)$$

where $V_{X(i)}$ is used to represent $$\frac{\partial V_X}{\partial x^{(i)}},$$

with x, y, u, v represented as $x^{(1)}$, $x^{(2)}$, $x^{(3)}$, $x^{(4)}$, respectively, to simplify expression of EQ. 13. The term g(x) is a weight function that varies across the light field, the error term $E_C(V)$ uses the warp function described above in connection with EQ. 8. Additionally, in some embodiments, weighted median filtering can be applied in each sub-aperture images.

Using global ray flow techniques described above may be more effective at preserving motion discontinuities in X/Y-motion than in Z-motion. In some embodiments, Z-motion accuracy can be improved by solving the 3D motion V in two steps. For example, an initial estimate of the X/Y-motion, which can be represented as $U=(U_X, U_Y)$, can first be calculated. The initial estimate of X/Y-motion, U, can then be used to compute a weight map for the regularization term g(x) as follows:

$$g(x) = \min_{x' \in \mathcal{N}(x)} e^{-\frac{|\nabla U_X|^2 + |\nabla U_Y|^2}{\sigma_w^2}}, \quad (14)$$

where $\mathcal{N}(x)$ denotes a local neighborhood of the point x. The full 3D motion V can then be computed using g(x), which is small where gradient of U is large. That is, the regularization term g(x) contributes less to the whole energy where there is a discontinuity in U.

In some embodiments, the error term $E_C(V)$ can be linearized, which can be represented as:

$$E'_C(V) = \int_\Omega \rho_D((L_X V_X + L_Y V_y + L_Z V_Z + L_t)^2) dx. \quad (15)$$

The energy, $E' = E'_C + E_S$, can then be minimized using Euler-Lagrange equations:

$$\rho'_D L_X(L_X V_X + L_Y V_Y + L_Z V_Z) - \lambda \sum_{i=1}^{4} \frac{\partial}{\partial x^{(i)}} (g \rho'_S(V_{X(i)}) V_{X(i)}) = \quad (16)$$

$$-\rho'_D L_X L_t$$

$$\rho'_D L_Y(L_X V_X + L_Y V_Y + L_Z V_Z) - \lambda \sum_{i=1}^{4} \frac{\partial}{\partial x^{(i)}} (g \rho'_S(V_{Y(i)}) V_{Y(i)}) =$$

$$-\rho'_D L_Y L_t$$

$$\rho'_D L_Z(L_X V_X + L_Y V_Y + L_Z V_Z) - \lambda_Z \sum_{i=1}^{4} \frac{\partial}{\partial x^{(i)}} (g \rho'_S(V_{Z(i)}) V_{Z(i)}) =$$

$$-\rho'_D L_Z L_t.$$

Where $\rho'_D$ is used to represent $\rho'_D((L_X V_X + L_Y V_Y + L_Z V_Z + L_t)^2)$. As described above, the system of Euler-Lagrange equations can be discretized and solved using SOR. In some embodiments, the linearization step can then be repeated, and the energy can be minimized using an iterative, multi-resolution approach.

Figure 8:
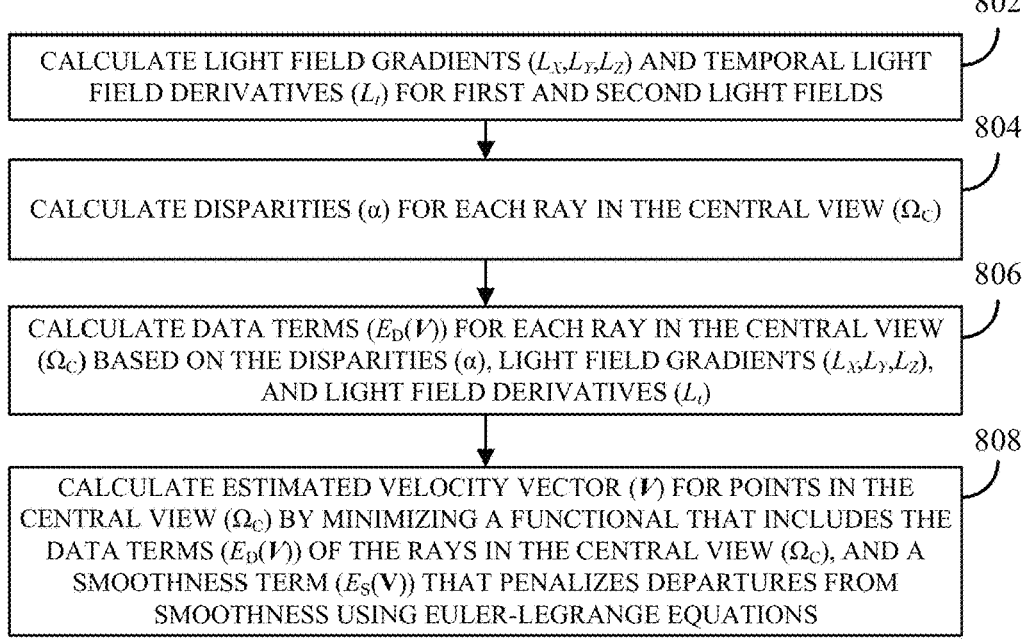
FIG. 8 shows an example of a process for calculating object motion between two light fields using hybrid local-global ray flow techniques in accordance with some embodiments of the disclosed subject matter.

FIG. 8 shows an example 800 of a process for calculating object motion between two light fields using hybrid local-global ray flow techniques in accordance with some embodiments of the disclosed subject matter. For some scenes, local constancy assumptions described above in connection with local ray flow techniques may be too restrictive, for example, when the scene includes a relatively large amount of non-rigid motion. Additionally, the global techniques described above may result in some portions of a scene being oversmoothed (e.g., complex boundaries, such as corners). Accordingly, combined local-global techniques (sometimes referred to as CLG) can operate based on the assumption that rays corresponding to the same scene point that are captured in different sub-aperture images have the same velocity, and that the 3D motion field generally varies smoothly over the scene.

In general, a light field camera captures multiple rays from the same scene point, all of which share the same motion. In some embodiments, using this as a constraint can improve the performance of ray-flow based motion recovery techniques described herein. For example, a ray that has coordinates (x, y, u, v), coming from a scene point S=[X, Y, Z], is on the same 2D plane $\mathcal{P}$(u, v) in the 4D light-field as all of the other rays that come from the same scene point S. This plane $\mathcal{P}$(u, v) can be represented as:

$$\mathcal{P}(u,v)=\{(x_i,y_i,u_i,v_i)|u_i=u-\alpha(x_i-x), v_i=v-\alpha(y_i-y)\}, \quad (17)$$

where the parameter $$\alpha = \frac{\Gamma}{Z}$$

is the disparity between sub-aperture images, and is a function of the depth Z of scene point S. Because the rays originate from the same scene point, these rays share the same motion vector V=($V_X$, $V_Y$, $V_Z$). Accordingly, V for the ray with coordinates (x, y, u, v) can be estimated by minimizing the following:

$$\min_V \sum_{x_i \in \mathcal{P}(u,v)} (L_{Xi}V_X + L_{Yi}V_Y + L_{Zi}V_Z + L_{ti})^2. \quad (18)$$

Note that this functional can be solved using techniques similar to those described above in connection with FIG. 6, which assumes constancy of ray motion in a local 4D ray neighborhood $\mathcal{N}$(u, v). and involves calculating or being supplied with a value for the parameter a (which can be determined using light-field based depth estimation techniques), While the local constancy assumption is only an approximation, the constancy of motion over the 2D plane described above in EQ. 17 is an exact constraint (although note that not all rays from the scene point S necessarily reach the image sensor, as they may be occluded from some, but not all, sub-aperture imagers), which can result in better performance. Moreover, in order to further regularize the problem, the global smoothness of motion assumption can also be used, as described above in connection with FIG. 7.

In some embodiments, a CLG technique can use a data term given by minimizing the local term (EQ. 18) for each ray in a central viewing window $\Omega_C$:

$$E_D(V)=\int_{\Omega_C}\Sigma_{x_i \in \mathcal{P}(u,v)}(L_{Xi}V_X+L_{Yi}V_Y+L_{Zi}V_Z+L_{ti})^2 du\, dv. \quad (19)$$

Note that the central viewing window $\Omega_C$ is used here to describe the central sub-aperture image in the light field. For example, in a light field with a 9×9 angular resolution (i.e., a light field including information from 81 sub-aperture images), the central viewing window can be the sub-aperture image indexed as (5,5). The local data term of EQ. 19 can be combined with a global smoothness term defined on $\Omega_C$:

$$E_S(V)=\int_{\Omega_C}(\lambda|\nabla V_X|^2+\lambda|\nabla V_Y|^2+\lambda Z|\nabla V_Z|^2)du\, dv \quad (20)$$

Note that the above formulation estimates motion only for the 2D central view $\Omega_C$ while utilizing the information from the whole light field, which can, in some embodiments, simultaneously achieve computational efficiency (e.g., in comparison to the global techniques described above in connection with FIG. 7) and high accuracy (e.g., in comparison to the local techniques described above in connection with FIG. 6, the global techniques described above in connection with FIG. 7, and depth-based motion estimation). Additionally, using techniques described above in connection with FIGS. 6 and 7, CLG techniques can outperform the techniques described above in connection with FIGS. 6 and 7.

Note that the CLG ray-flow techniques described herein use the estimated depths implicitly as an additional constraint for regularization. Therefore, estimating depths accurately is not critical for recovering motion, since the motion is still computed via the ray-flow equation, and not by computing the difference between depths. Accordingly, the accuracy of the depth estimates does not strongly influence the motion estimates.

At 802, process 800 can calculate light field gradients (e.g., ($L_X$, $L_Y$, $L_Z$)) and temporal light field derivatives (e.g., ($L_t$)) for rays in the first light field.

At 804, process 800 can calculate disparities α for each ray in the central viewing window $\Omega_C$. For example, as described above in connection with EQ. 17, the depth Z if each scene point corresponding to a ray in the central viewing window can be estimate, and disparities α can be calculated based on the distance Γ from the imaging plane to the plane used to define the relative coordinates (u, v) of the light field.

At 806, process 800 can calculate a local (or data) term ($E_D$(V)) for each ray in the central viewing window $\Omega_C$ based on the disparities α calculated at 804, and the light field gradients ($L_X$, $L_Y$, $L_Z$, $L_t$) calculated at 802.

In some embodiments, the local term can be represented as:

$$E_D(V)=\int_{\Omega_C}\Sigma_{x_i \in \mathcal{P}(u,v)}h_i\rho_D((L_0(x_i)-L_1(w(x_i,V)))^2)du\, dv \quad (21)$$

where $\mathcal{P}$(u, v) is the 2D plane defined in EQ. (17). Note that each ray in the 2D plane can be associated with a different weight $h_i$, which can be represented as:

$$h_i = h(x_i, x_c) = h_g(x_i, x_c) \cdot h_o(x_i, x_c) \quad (22)$$

$$h_g(x_i, x_c)e^{-\frac{(x_i-x_c)^2+(y_i-y_c)^2+(u_i-u_c+\alpha(x_i-x_c))^2+(v_i-v_c+\alpha(y_i-y_c))^2}{\sigma_g^2}} \quad (23)$$

$$h_o(x_i, x_c) = e^{-\frac{(d_{\alpha i}-d_{\alpha c})^2}{\sigma_o^2}} \quad (24)$$

where $x_c$ denotes the center ray of the window. $d_\alpha=1/\alpha$ and is proportional to the actual depth of the scene point.

In some embodiments, $h_g$ can define a Gaussian weight function that is based on the distance between $x_i$ and $x_c$ in the 2D plane. $h_o$ can define an occlusion weight by penalizing the difference in the estimated disparity at $x_i$ and $x_c$. Note that, due to occlusion, not all rays on $\mathcal{P}$(u, v) necessarily correspond to the same scene point as $x_c$. For example, if the scene point corresponding to $x_i$ occludes or is occluded by the scene point corresponding to $x_c$, they will have a different α and thus a small value of $h_o$.

At 808, process 800 can calculate estimated velocities V for scene points in the central viewing window $\Omega_C$ by minimizing a functional that includes both local terms ($E_D$(V)) and a smoothness term ($E_S$(V)) that is defined across the central viewing window $\Omega_C$, and that penalizes discontinuities in velocity over the central viewing window $\Omega_C$.

In some embodiments, the smoothness term can be represented as:

$$E_S(V) = \int_{\Omega_C} g(x)(\lambda \Sigma_{i=1}^2 \rho_S(V_{X(i)}^2) + \lambda \Sigma_{i=1}^2 \rho_S(V_{Y(i)}^2) + \lambda_Z \Sigma_{i=1}^2 \rho_S(V_{Z(i)}^2)) du\, dv \quad (25)$$

where $V_{X(i)}$ is short for $$\frac{\partial V_X}{\partial u^{(i)}}.$$

(For simplicity u, v are denoted as $u^{(1)}$, $u^{(2)}$ respectively in EQ. 25.), and g(x) is a weight function that varies across the light field. As described above in connection with FIG. 7, penalty functions $\rho_D$, $\rho_S$ can be the generalized Charbonnier penalty function $\rho(x^2) = (x^2 + \in^2)^a$ with a=0.45. In some embodiments, the weight function g(x) can include two parts, which can be combined using a harmonic mean:

$$g(x) = \frac{g_c(x) g_d(x)}{g_c(x) + g_d(x)} \quad (26)$$

In some embodiments, accuracy of the Z-motion, we solve the 3D motion V in a two-step process. For example, in practice motion discontinuity is generally observed to be better in XY-motion than in Z-motion. First, an initial estimate of the XY-motion can be calculated, denoted as $U = (U_X, U_Y)$, in the first pass. Then, U can be used to compute a weight map for the regularization term:

$$g_c(x) = \frac{1}{1 + \frac{|\nabla U_X|^2 + |\nabla U_Y|^2}{\sigma_c^2}} \quad (27)$$

The full 3D motion V can then be computed in a second pass. Note that g(x) is generally small where the gradient of U is large. That is, the regularization term generally contributes less to the whole energy where there is a discontinuity in U. Additionally, in some embodiments, the techniques described herein can be implemented based on the assumption that the motion boundaries are likely to align with depth boundaries. That is, a lower weight can be assigned for points where the depth gradient is large:

$$g_d(x) = \frac{1}{1 + \frac{|\nabla d_\alpha|^2}{\sigma_d^2}} \quad (28)$$

In some embodiments, process 800 can use any suitable technique to solve for the velocity vector. For example, the local term $E_D(V)$ can be linearized as:

$$E'_D(V) = \int_{\Omega_C} \Sigma_{x_i \in \mathcal{P}(u,v)} h_i \rho_D((L_{Xi} V_X + L_{Yi} V_Y + L_{Zi} V_Z + L_{ti})^2) du\, dv \quad (29)$$

The entire energy $E' = E'_D + E_S$ can be minimized using Euler-Lagrange equations:

$$\sum_{x_i \in \mathcal{P}(u,v)} h_i \rho'_D L_X L_D - \lambda \sum_{i=1}^{2} \frac{\partial}{\partial u^{(i)}} (g \rho'_S(V_{X(i)}) V_{X(i)}) = \quad (30)$$

$$-\sum_{x_i \in \mathcal{P}(u,v)} h_i \rho'_D L_X L_t$$

$$\sum_{x_i \in \mathcal{P}(u,v)} h_i \rho'_D L_Y L_D - \lambda \sum_{i=1}^{2} \frac{\partial}{\partial u^{(i)}} (g \rho'_S(V_{Y(i)}) V_{Y(i)}) =$$

$$-\sum_{x_i \in \mathcal{P}(u,v)} h_i \rho'_D L_Y L_t$$

$$\sum_{x_i \in \mathcal{P}(u,v)} h_i \rho'_D L_Z L_D - \lambda_Z \sum_{i=1}^{2} \frac{\partial}{\partial u^{(i)}} (g \rho'_S(V_{Z(i)}) V_{Z(i)}) =$$

$$-\sum_{x_i \in \mathcal{P}(u,v)} h_i \rho'_D L_X L_t$$

where $\rho'_D$ is short for $\rho'_D((L_X V_X + L_Y V_Y + L_Z V_Z + L_t)^2)$, and $L_D$ is short for $(L_X V_X + L_Y V_Y + L_Z V_Z)$. As described above in connection with FIG. 7, these equations can be discretized and solved using SOR to calculate V for scene points in the central viewing window $\Omega_C$ simultaneously. The linearization step can then be repeated and the energy can be minimized in an iterative, multi-resolution way.

Figure 9:
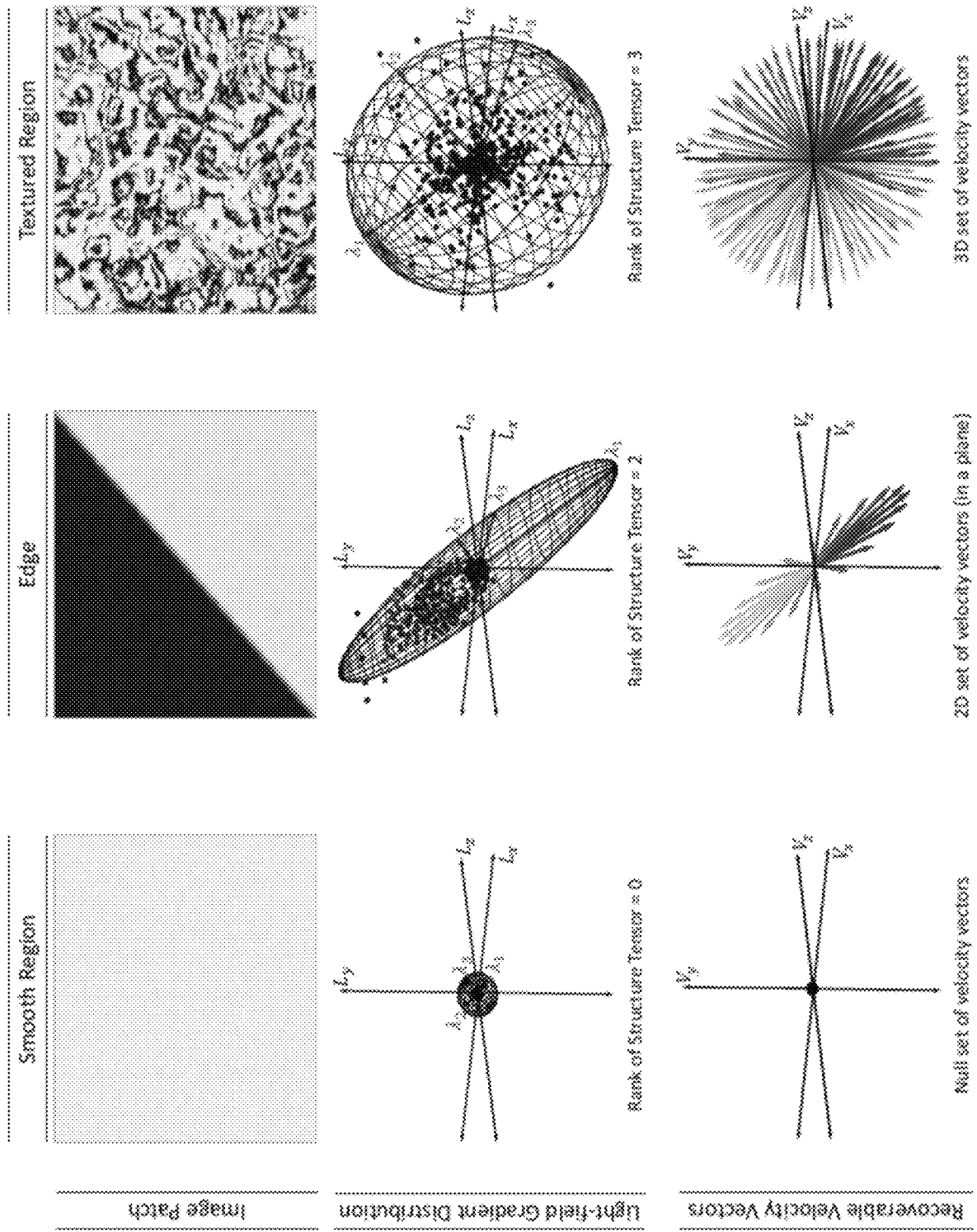
FIG. 9 shows examples of scene patches and corresponding velocities that can be calculating for objects represented in the scene patches in accordance with some embodiments of the disclosed subject matter.

FIG. 9 shows examples of scene patches and corresponding velocities that can be calculating for objects represented in the scene patches in accordance with some embodiments of the disclosed subject matter. As described above in connection with FIG. 4, while it is impossible to recover the complete 3D motion vector from a single ray flow equation, using additional constraints imposed by the local constancy assumption 3D motion can be recovered, but the space of recoverable motions varies with the composition of the scene. The space of recoverable motions generally depends on the local structure of the light field. For example, if the local window corresponds to a textureless scene (e.g., "smooth region" in FIG. 9), then no motion is recoverable, whereas for a local window corresponding to a highly textured scene (e.g., "textured region" in FIG. 9) motion is recoverable along all three dimensions. Note that the properties of the 3×3 symmetric matrix $S = A^T A$ (i.e., the light field structure tensor). S can encode the local structure of the light field, which can be used to convey the performance of the local ray flow techniques in terms of the rank of the structure tensor.

In accordance with the mechanisms described herein, structure tensor S has three possible ranks for a local 4D light field window: 0, 2, and 3. These ranks correspond to scene patches with no texture (e.g., "smooth region" in FIG. 9), an edge (i.e., "edge" in FIG. 9), and 2D texture (e.g., "textured region" in FIG. 9), respectively.

For smooth regions, $L_X = L_Y = L_Z = 0$, for all the locations in the light field window. Accordingly, all the entries of the structure tensor S are zero, and for a local 4D light field window can be characterized as a rank 0 matrix. As shown in FIG. 9, all three eigenvalues $\lambda_1, \lambda_2, \lambda_3 = 0$ for the smooth region. As a result, it has a 3-D null space, and no motion vector can be recovered reliably for this window.

For a window with a single step edge, such as a light field window corresponding to a fronto-parallel scene patch with a vertical edge (i.e., $L_Y = 0$.), the middle row of the structure tensor is all zeros, and can be characterized as a rank 2 matrix, with a 1-D null space (note that, as shown in FIG. 9, only one eigenvalue $\lambda_3 = 0$). Accordingly, a 2D family of motions (e.g., motions orthogonal to the edge) can be recovered, as shown in FIG. 9.

For a window with 2D texture, all three derivatives are non-zero and independent, and the structure tensor is full rank (i.e., rank=3), which indicates that the entire space of 3D motions are recoverable.

Note that, unlike the structure tensor for 2D optical flow, which is a 2×2 matrix that can have ranks from 0 to 2, for light fields the structure tensor cannot have rank 1. This is because even a 4D window with a single step edge results in a rank 2 structure tensor. Note that, although the light field structure tensor theoretically has rank 2, the ratio of the first and second eigenvalues, $$\frac{\lambda_1}{\lambda_2},$$

can be large because the eigenvalue corresponding to Z-motion depends on the range of (u, v) coordinates, which is limited by the size of the light field window. Therefore, a sufficiently large window size is required for motion recovery.

Figure 10A:
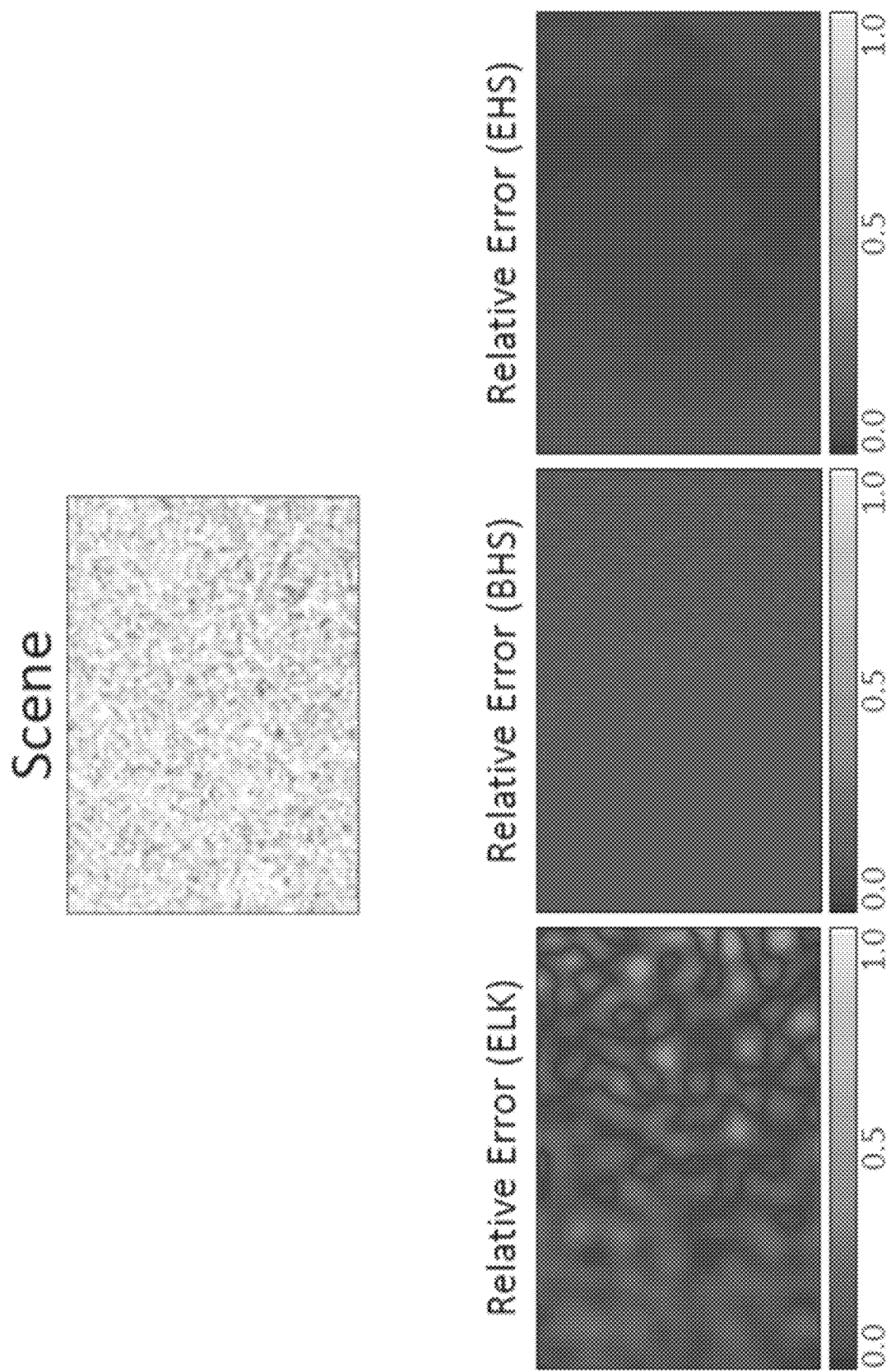
FIG. 10A shows an example of a scene and relative errors observed when estimating motion using techniques in accordance with some embodiments of the disclosed subject matter.
Figure 10B:
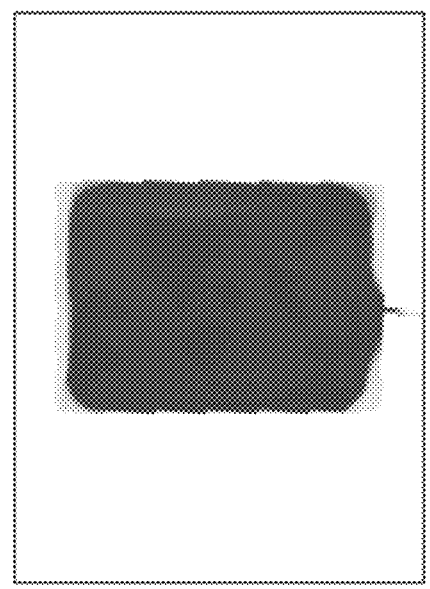
FIG. 10B shows an example of another scene and relative errors observed when estimating motion using techniques in accordance with some embodiments of the disclosed subject matter.
Figure 10B:
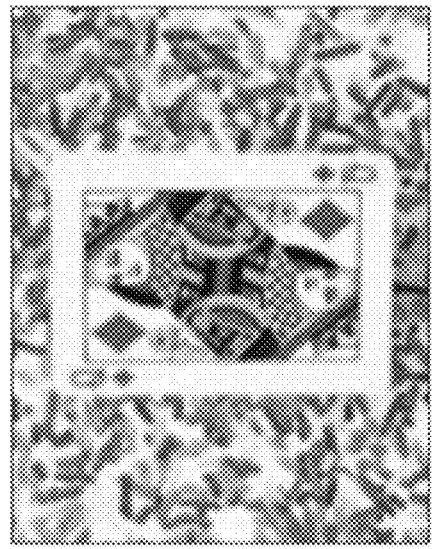
Figure 10B:
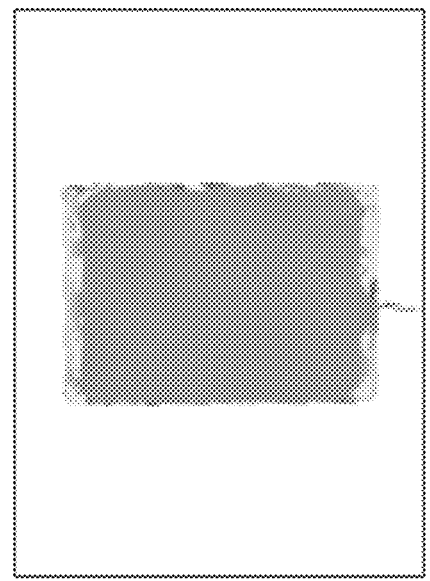
Figure 10B:
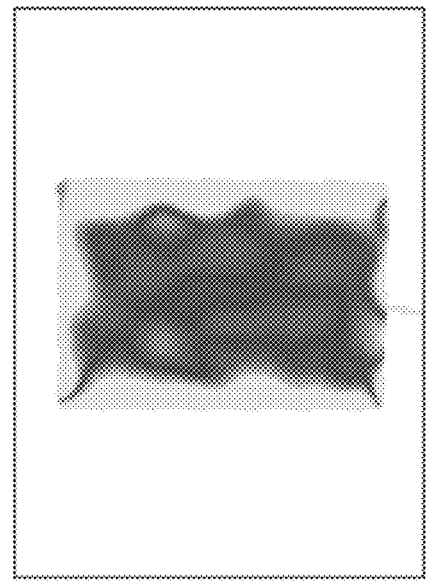
Figure 11:
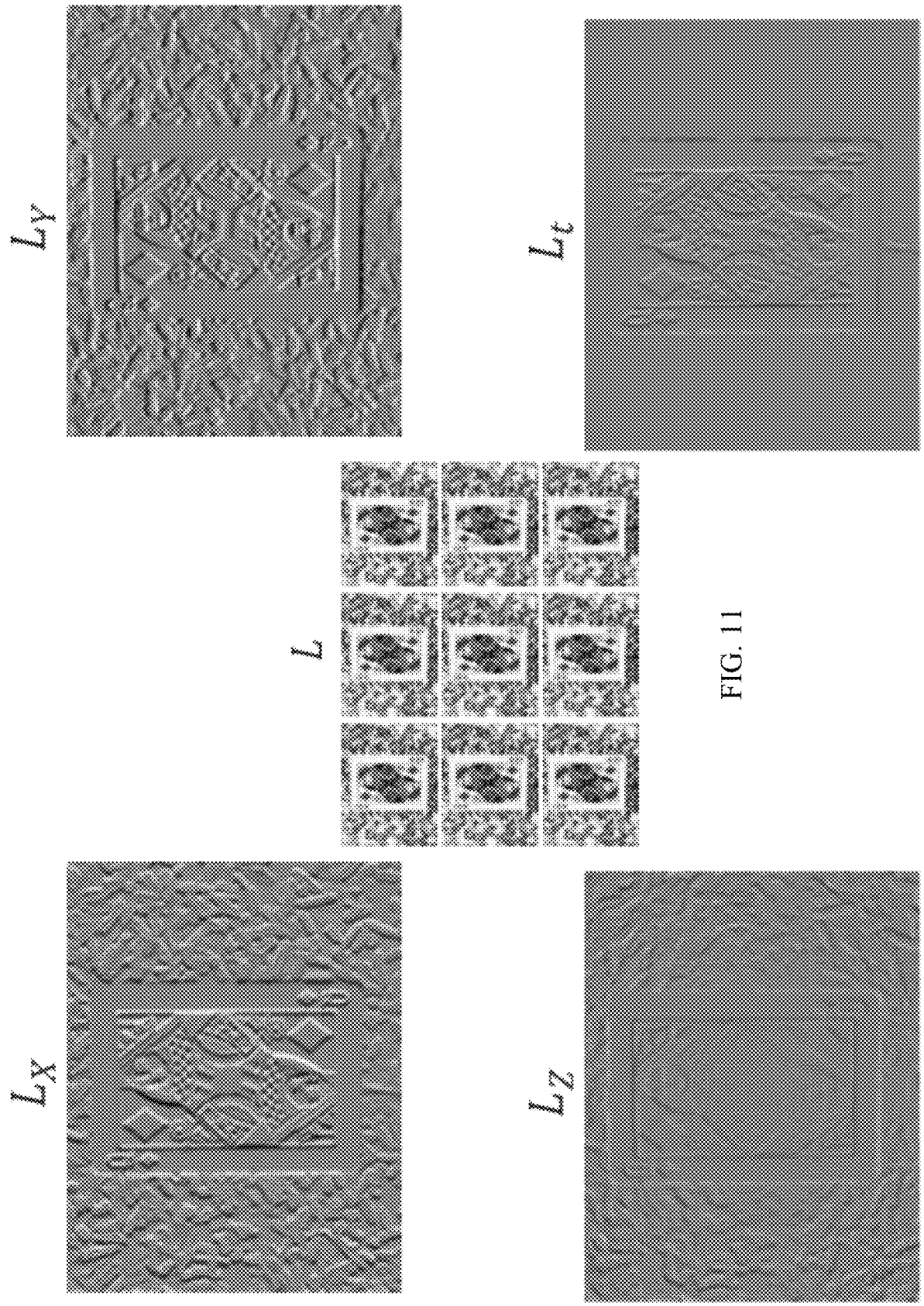
FIG. 11 shows an example of measurements of light field gradients for various parameters for a moving scene between light fields captured at different times while the scene is changing calculated using techniques in accordance with some embodiments of the disclosed subject matter.

FIGS. 10A and 10B show examples of scenes and relative errors observed when estimating motion using techniques in accordance with some embodiments of the disclosed subject matter. The results shown in FIGS. 10A and 10B were generated by capturing multiple light fields with a LYTRO ILLUM light field camera, which was calibrated using a geometric calibration toolbox. The motion estimates used to measure the relative errors in FIGS. 10A and 10B were calculated from 81 sub-aperture images captured in the center of the image sensor (i.e., the central 9×9 array of sub-aperture images), each of which had a spatial resolution of 552×383. As described below, FIG. 11 shows an example of sub-aperture images of a light field, and the computed gradients.

FIG. 10A compares the performance of a local ray flow technique and two global ray flow techniques. The local ray flow technique (referred to in FIGS. 10A and 10B as "enhanced Lucas-Kanade" (ELK)), was implemented in accordance with techniques described above in connection with EQS. 8 and 9. The first global ray flow techniques (referred to in FIGS. 10A and 10B as "basic Horn-Schunck" (BHS)), was implemented in accordance with techniques described above in connection with EQS. 10 and 11. The second global ray flow techniques (referred to in FIGS. 10A and 10B as "enhanced Horn-Schunck" (EHS)), was implemented in accordance with techniques described above in connection with EQS. 12-16. The scene evaluated in FIG. 10A is a fronto-parallel moving plane, while the scene evaluated in FIG. 10B is a moving playing card in front of a static background. The moving objects were mounted on a controllable translation stage (precision of 40 micrometers (μm)) for ground-truth comparisons.

FIGS. 10A and 10B show relative motion error, which was defined as $$E_{rel} = \frac{\|V_{estimated} - V_{ground\ truth}\|}{\|V_{ground\ truth}\|}.$$

ELK was implemented with a 9×9×41×41 window, while EHS was implemented with $\lambda=8$, $\lambda_Z=1$.

As shown in FIGS. 10A and 10B, ELK was accurate in some regions, but resulted in relatively large errors around motion boundaries (e.g., as shown in FIG. 10B at the boundary of the moving card). By contrast, EHS recovered motion with considerably higher accuracy. Comparisons for the card scene, and the fronto-parallel plane, for two different textures, and three different motions (laterally along X, axially along Z, and diagonally along X/Z) are shown in Table 2, below. Note that the global techniques consistently out-performed the local technique, which is generally consistent with the trends in optical flow, where global methods generally outperform local methods. However, local techniques are generally less computationally intensive, and accordingly may be preferable for certain applications (e.g., for real-time applications, low power applications, low cost applications, etc.).

TABLE 2

|           | Enhanced LK | Enhanced HS |
|-----------|-------------|-------------|
| Plane1-0  | 0.179       | 0.101       |
| Plane1-45 | 0.131       | 0.080       |
| Plane1-90 | 0.052       | 0.044       |
| Plane2-0  | 0.254       | 0.118       |
| Plane2-45 | 0.104       | 0.053       |
| Plane2-90 | 0.055       | 0.038       |
| Card      | 0.341       | 0.035       |

Note that the performance of ray flow-based techniques, in addition to being influenced by scene texture and light field structure, also depends on the imaging parameters of the light field camera, as described in more detail below in connection with FIGS. 16A and 16B. For example, using the ray flow equation requires computing angular light field gradients ($L_X$ and $L_Y$), where the accuracy of the calculation depends on the angular resolution of the light field camera. Many commercially available light field cameras have a relatively low angular resolution (e.g., the LYTRO ILLUM camera has an angular resolution of 15×15 sub-aperture images), which may result in aliasing. In order to mitigate aliasing, the light field can be pre-filtered with a Gaussian filter before computing the gradients. Another parameter that may impact performance is the aperture size, which limits the maximum amount of recoverable motion as described below in connection with FIGS. 16A and 16B.

FIG. 11 shows an example of measurements of light field gradients for various parameters for a moving scene between light fields captured at different times while the scene is changing calculated using techniques in accordance with some embodiments of the disclosed subject matter. As shown in FIG. 11, the light field L includes sub-aperture images, and the gradients ($L_X$, $L_Y$, $L_Z$, $L_t$) correspond to the features of the sub-aperture images that are moving between frames.

Figure 12:
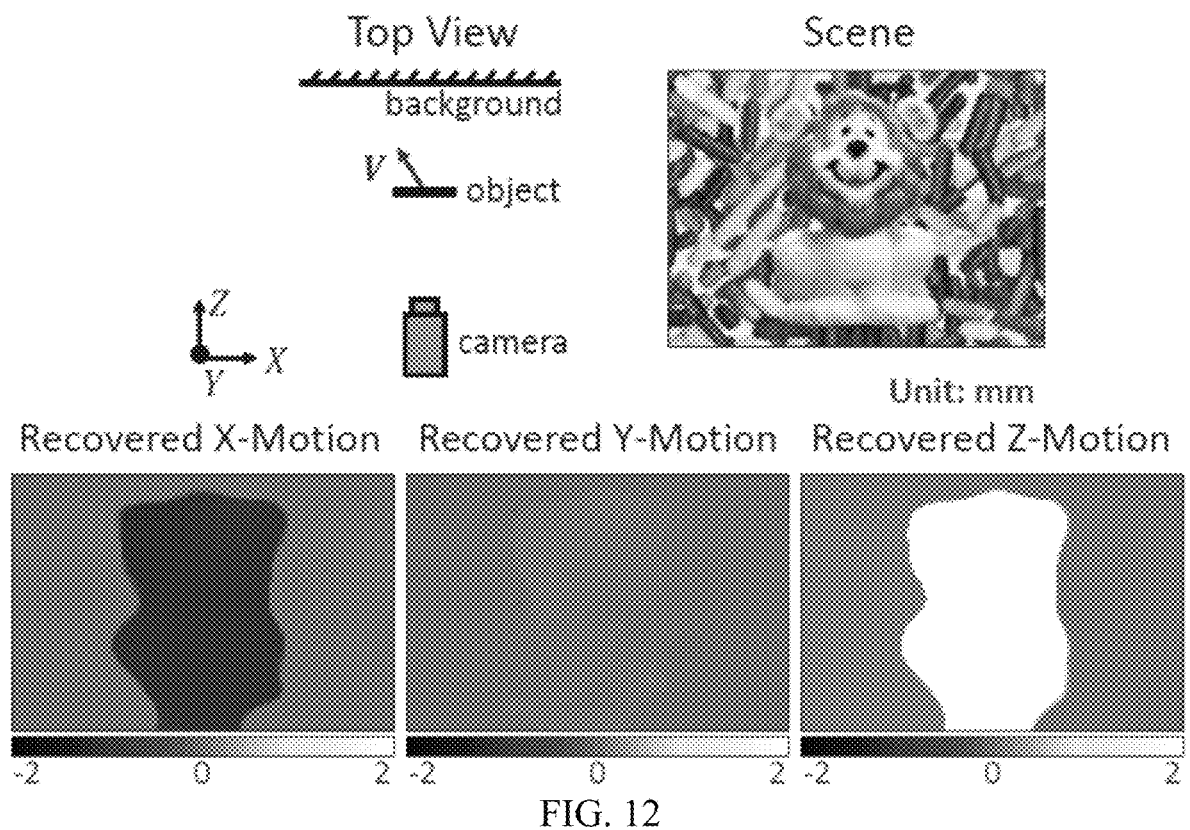
FIG. 12 shows an example of a scene with a single non-planar object, and detected motion in the scene calculated based on light fields captured at different times while the object is moving using techniques in accordance with some embodiments of the disclosed subject matter.
Figure 13:
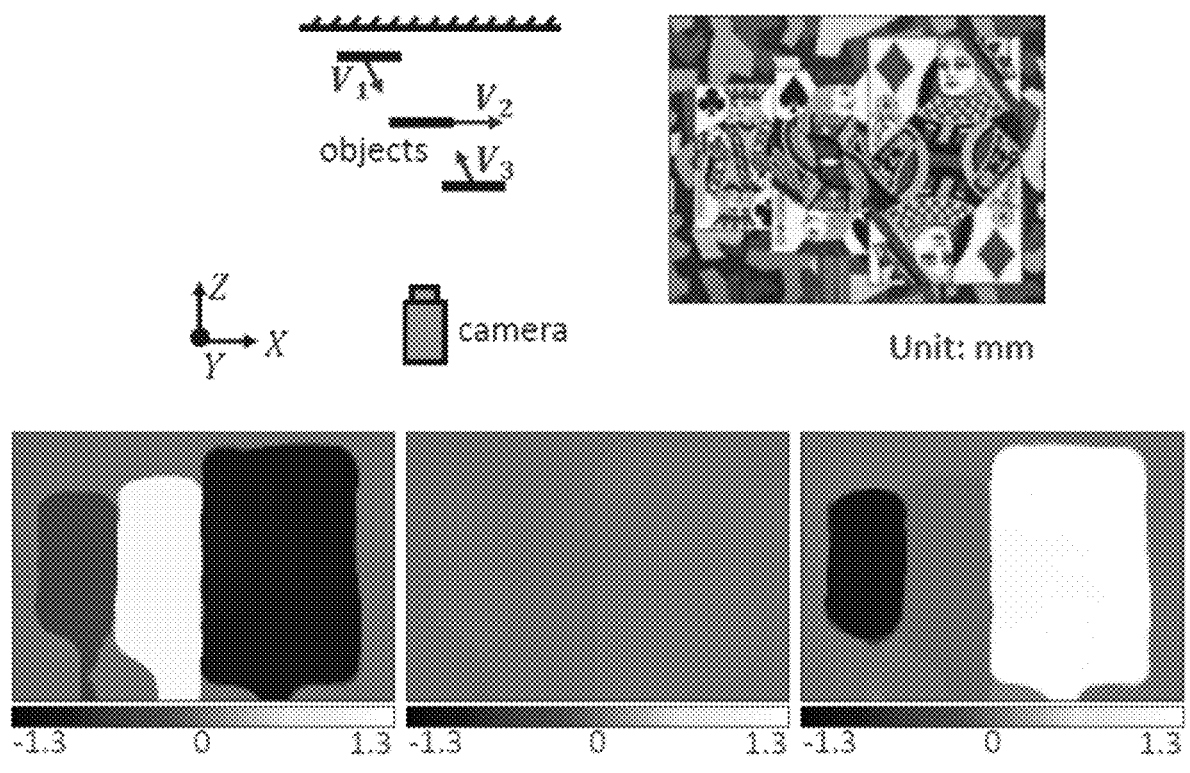
FIG. 13 shows an example of a scene with a multiple objects moving at different speeds and in different directions, and detected motion in the scene calculated based on light fields captured at different times while the objects are moving using techniques in accordance with some embodiments of the disclosed subject matter.

FIG. 12 shows an example of a scene with a single non-planar object, and detected motion in the scene calculated based on light fields captured at different times while the object is moving using techniques in accordance with some embodiments of the disclosed subject matter, and FIG. 13 shows an example of a scene with a multiple objects moving at different speeds and in different directions, and detected motion in the scene calculated based on light fields captured at different times while the objects are moving using techniques in accordance with some embodiments of the disclosed subject matter. FIGS. 12 and 13 show motion recovery results for scenes with non-planar geometry, and multiple, independently moving objects. The light fields were captured while the moving objects (a lion figurine in FIG. 12, and playing cards in FIG. 13) were being moved by controllable translation stages to which the objects were mounted. Note that, despite multiple occlusions with depth boundaries, the motion of each object was estimated accurately and motion boundaries were preserved.

FIG. 14 shows an example of a scene with a single rotating object, and detected motion in the scene calculated based on light fields captured at different times while the object rotates using techniques in accordance with some embodiments of the disclosed subject matter, and FIG. 15 shows an example of a scene with a non-rigid object moving in a complex manner, and detected motion in the scene calculated based on light fields captured at different times using techniques in accordance with some embodiments of the disclosed subject matter. FIGS. 14 and 15 show motion recovery results for complex motions, including rotation, and non-rigid deformation. As shown in FIG. 14, gradually changing X/Z-motion in rotation was recovered while preserving the motion boundaries, while FIG. 15 shows that a non-rigid motion field of a deforming hand was recovered.

Figure 16A:
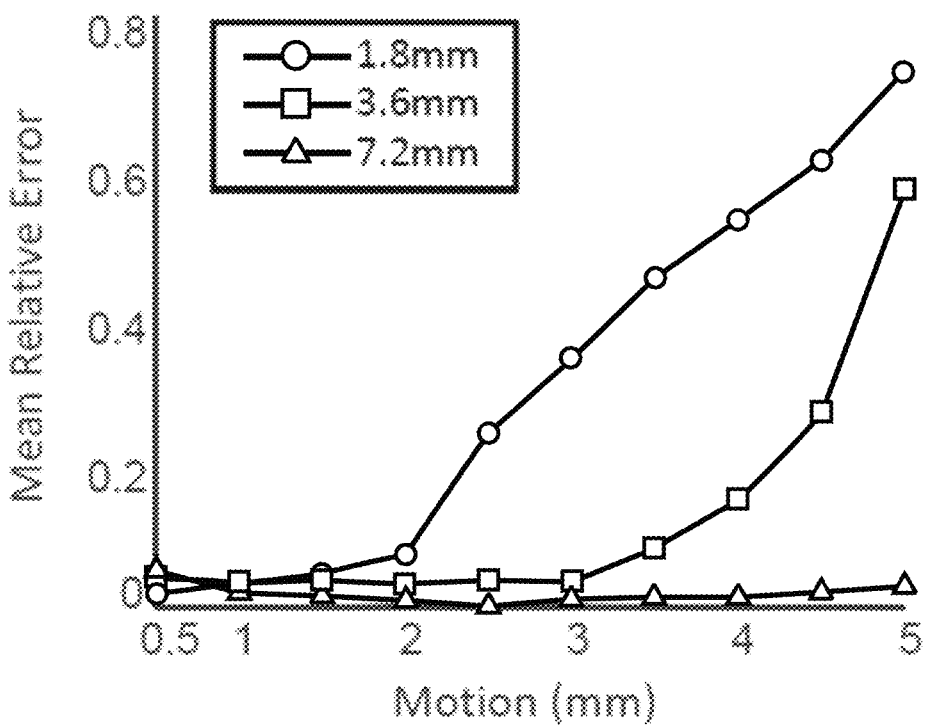
FIG. 16A shows a chart illustrating observed mean relative error for motions of different magnitudes when using different aperture sizes to capture light field image data used to calculate motion using techniques in accordance with some embodiments of the disclosed subject matter.
Figure 16B:
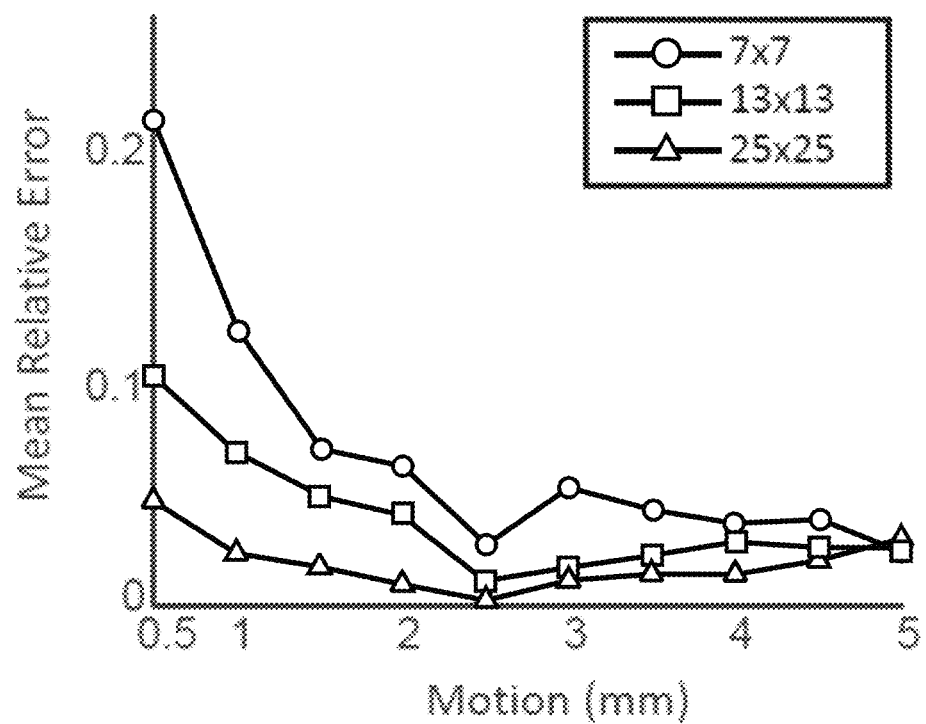
FIG. 16B shows a chart illustrating observed mean relative error for motions of different magnitudes when using different angular resolutions to capture light field image data used to calculate motion using techniques in accordance with some embodiments of the disclosed subject matter.

FIGS. 16A and 16B show charts illustrating observed mean relative error for motions of different magnitudes when using different aperture sizes to capture light field image data used to calculate motion, and when using different angular resolutions, respectively, using techniques in accordance with some embodiments of the disclosed subject matter. The angular resolution used to generate the values in FIG. 16A was 7×7, and aperture used to generate the values in FIG. 15B was 7.2 mm.

Note that the results shown are for a global ray flow technique implemented in accordance with techniques described above in connection with FIGS. 13-17, but similar results are likely for other techniques described herein. The results were calculated based on simulated images, as the camera parameters can be more easily adjusted in simulation, using a light field rendering engine based on POV-Ray, which generates physically realistic noise on the images in addition to modeling the geometric distribution of light rays captured by a light field camera.

In general, the aperture size of a light field camera defines the range of x, y coordinates in the captured light fields. The results shown in FIG. 16A are based on a sequence of images with different amount of motion along the X-axis using the simulation engine, and the chart plots the mean relative error against the amount of motion for three different effective aperture sizes: 1.8 mm, 3.6 mm and 7.2 mm. As shown in FIG. 16A, error increases as the amount of motion increases, because scene motion causes a ray to translate in the x, y dimensions, so the maximum motion that can be detected is limited based on the aperture size. Note that the maximum recoverable motion increased as the aperture size increased.

In general, the accuracy of motion estimation is also determined by the angular resolution of the light field camera (i.e., the number of sub-aperture images that are captured). The results shown in FIG. 16B are based on the sequence of images with different amount of motion along the X-axis using the simulation engine, and the chart plots the mean relative error against the amount of motion for three different angular resolutions: 7×7, 13×13 and 25×25. As shown in FIG. 16B, when the motion is relatively small, higher angular resolution produces much smaller errors, but as the motion increase the difference between different resolution becomes less significant. Since scene motion is related to the light field gradients along x/y coordinates (i.e., angular dimensions), the resolution of motion recovery depends on the angular resolution. For small motion, the error due to low resolution dominates the relative error, but for larger motions this error is negligible, and other factors (e.g., noise, convergence to local minimum, etc.) become more important. These experiments demonstrate that the aperture size has a stronger influence on the performance for larger motion, whereas the angular resolution plays a more important part for small motions.

Figure 17:
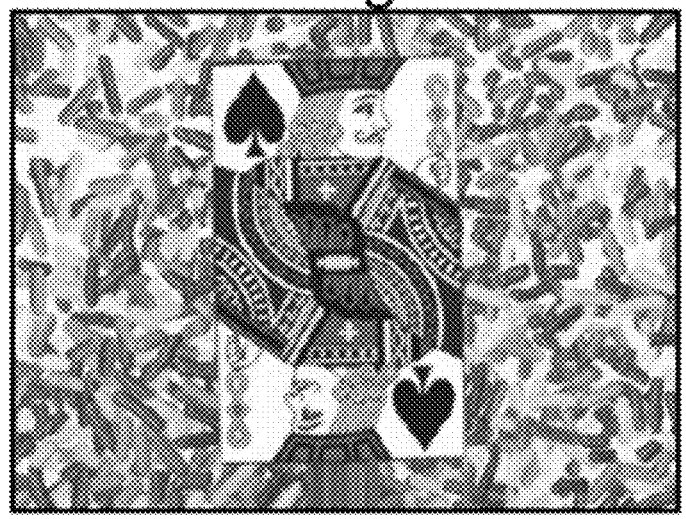
FIG. 17 shows an example of a scene with a single moving object, and a comparison of motion in the scene calculated using techniques in accordance with some embodiments of the disclosed subject matter to motion in the scene calculated using other techniques.
Figure 17:
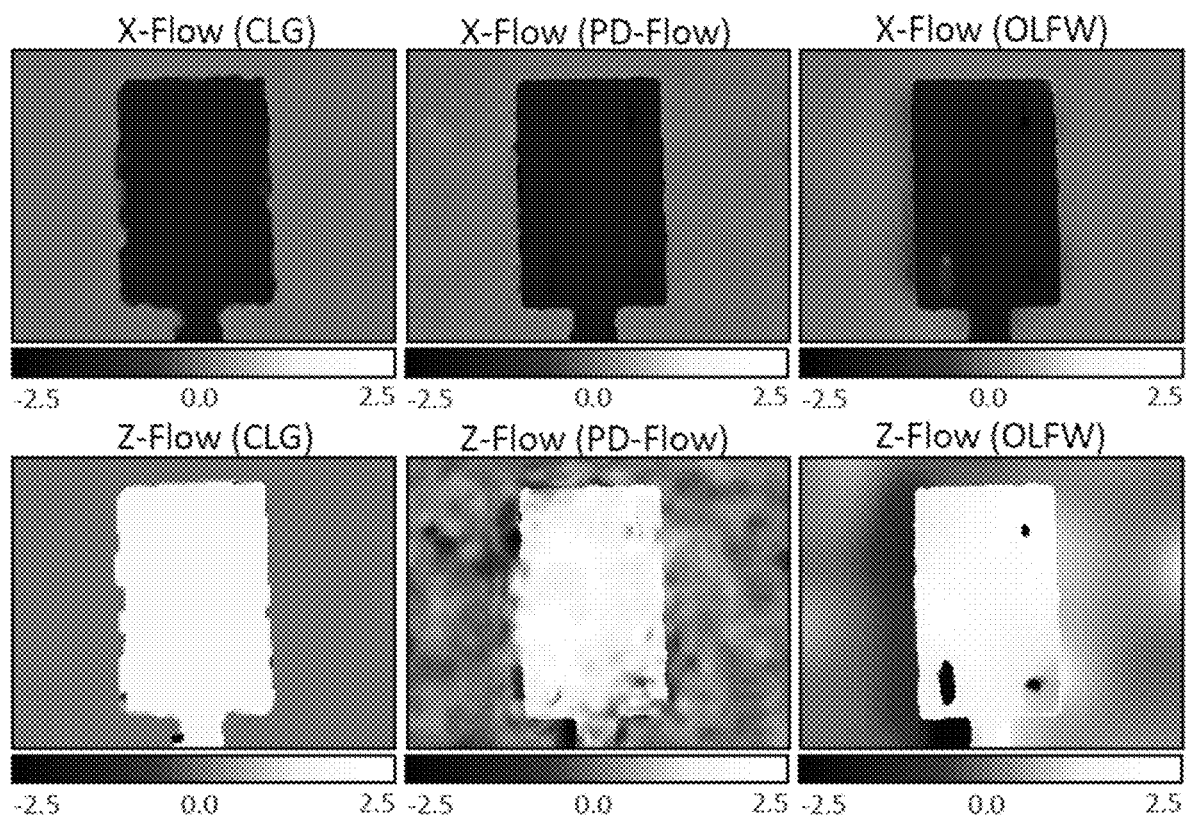

FIG. 17 shows an example of a scene with a single moving object, and a comparison of motion in the scene calculated using techniques in accordance with some embodiments of the disclosed subject matter to motion in the scene calculated using other techniques. As shown in FIG. 17, motion was calculated for a scene corresponding to the image in which the playing card was moving left (i.e., in the −X direction) and away the camera (i.e., in the +Z direction). The results on the left show motion recovery calculated using techniques in accordance with techniques described above in connection with EQS. 17-30 (CLG). The results in the center show motion recovery using techniques described in Jaimez et al., "A primal-dual framework for real-time dense RGB-D scene flow," *Robotics and Automation (ICRA), 2015 IEEE International Conference on.* IEEE, 2015, using an RGB-D camera (PD-Flow). The results on the right show motion recovery using techniques described in Srinivasan et al., "Oriented light-field windows for scene flow," *Proceedings of the IEEE International Conference on Computer Vision.* 2015, (OLFW). As shown in FIG. 17, while the results for X-motion are not noticeably different, EHS calculated Z-motion much more precisely.

Figure 18:
FIG. 18 shows an example of a scene with multiple objects moving at different speeds and in different directions, and a comparison of motion in the scene calculated using techniques in accordance with some embodiments of the disclosed subject matter to motion in the scene calculated using other techniques.
Figure 18:
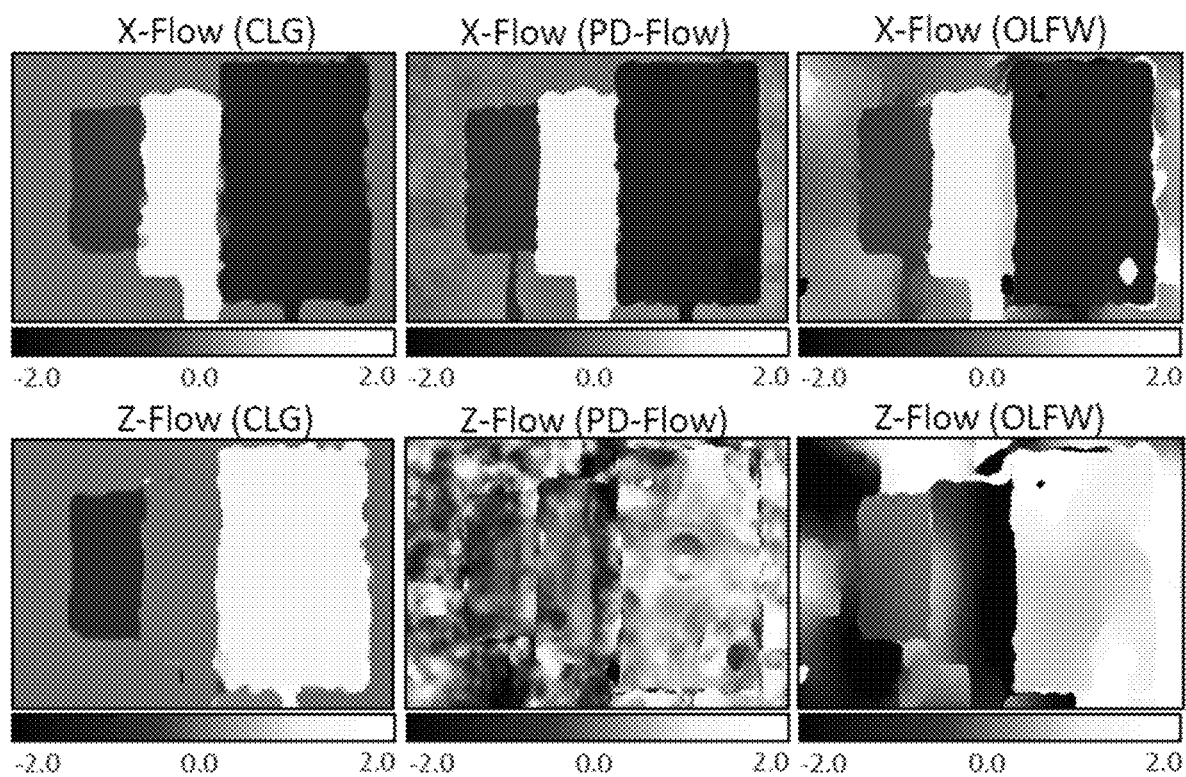

FIG. 18 shows an example of a scene with multiple objects moving at different speeds and in different directions, and a comparison of motion in the scene calculated using techniques in accordance with some embodiments of the disclosed subject matter to motion in the scene calculated using other techniques. As shown in FIG. 18, motion was calculated for the scene described above in connection with FIG. 13 using the same techniques used to calculate motion in FIG. 17. FIG. 18 shows that for multiple independently moving objects, CLG produced more consistent motion vectors for X-motion, and much more consistent motion vectors for Z-motion. Note that both PD-Flow and OLFW generated observable erroneous motion measurements for the background regions, which was stationary.

Figure 19:
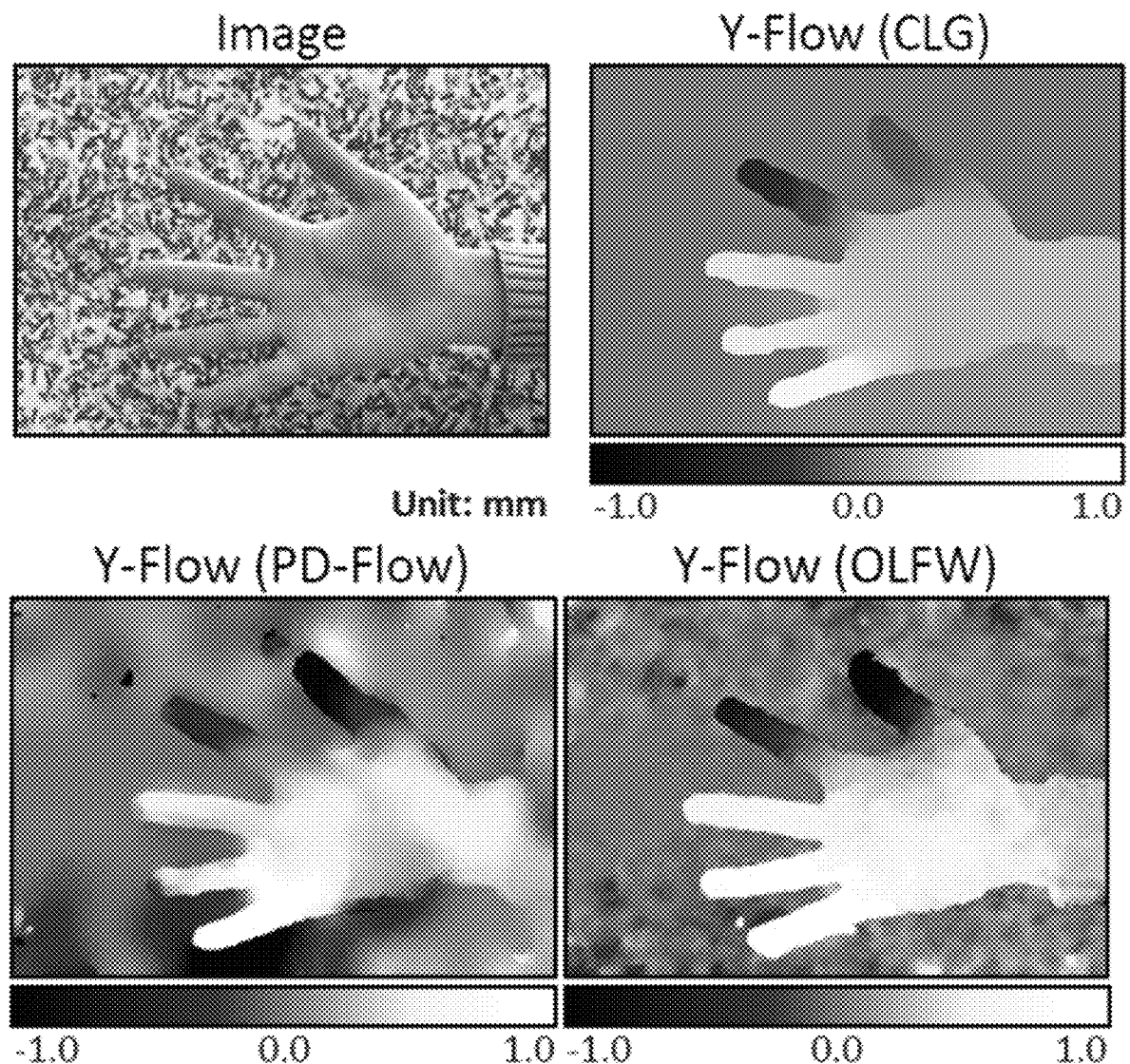
FIG. 19 shows an example of a scene with a non-rigid object moving in a complex manner, and a comparison of motion in the scene calculated using techniques in accordance with some embodiments of the disclosed subject matter to motion in the scene calculated using other techniques.

FIG. 17 shows an example of a scene with a non-rigid object moving in a complex manner, and a comparison of motion in the scene calculated using techniques in accordance with some embodiments of the disclosed subject matter to motion in the scene calculated using other techniques. As shown in FIG. 18, motion was calculated for a scene that included a hang with the fingers being drawn together using the same techniques used to calculate motion in FIG. 17. FIG. 19 shows that for a non-rigid deforming object, EHS produced more consistent motion vectors for Y-motion, and produced a negligible amount of erroneous measurements in the regions corresponding to the stationary background. By contrast, PD-Flow and OLFW generated very inconsistent motion measurements for the stationary background regions, including many erroneous measurements.

Figure 20:
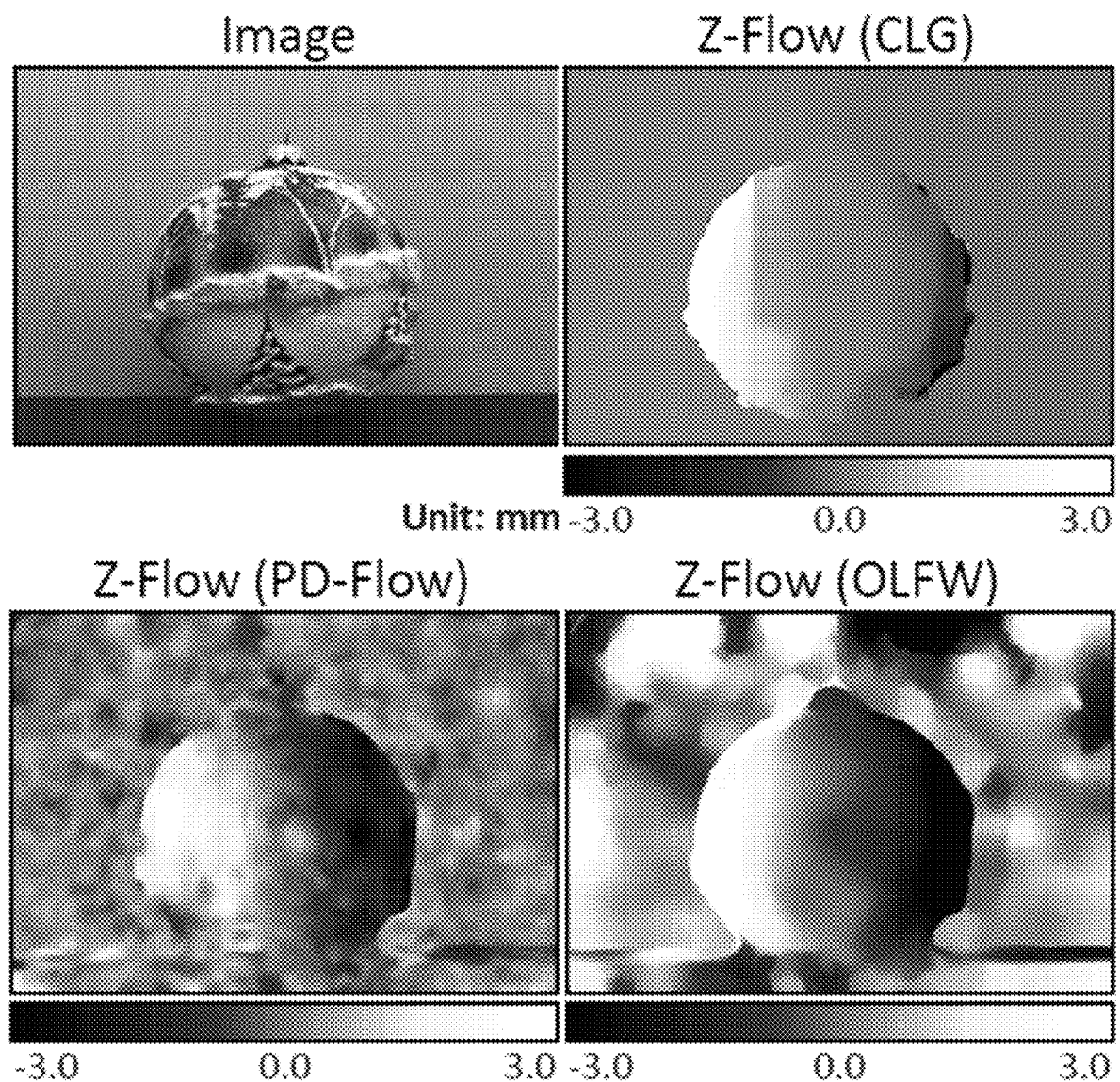
FIG. 20 shows an example of a scene with a single rotating object, and a comparison of motion in the scene calculated using techniques in accordance with some embodiments of the disclosed subject matter to motion in the scene calculated using other techniques.

FIG. 20 shows an example of a scene with a single rotating object, and a comparison of motion in the scene calculated using techniques in accordance with some embodiments of the disclosed subject matter to motion in the scene calculated using other techniques. As shown in FIG. 20, motion was calculated for the scene described above in connection with FIG. 14 using the same techniques used to calculate motion in FIG. 17. FIG. 20 shows that for a rotating object, CLG produced more consistent motion vectors for Z-motion, and produced a negligible amount of erroneous measurements in the regions corresponding to the stationary background. By contrast, PD-Flow and OLFW generated very inconsistent motion measurements for the stationary background regions, including many erroneous measurements.

Figure 21:
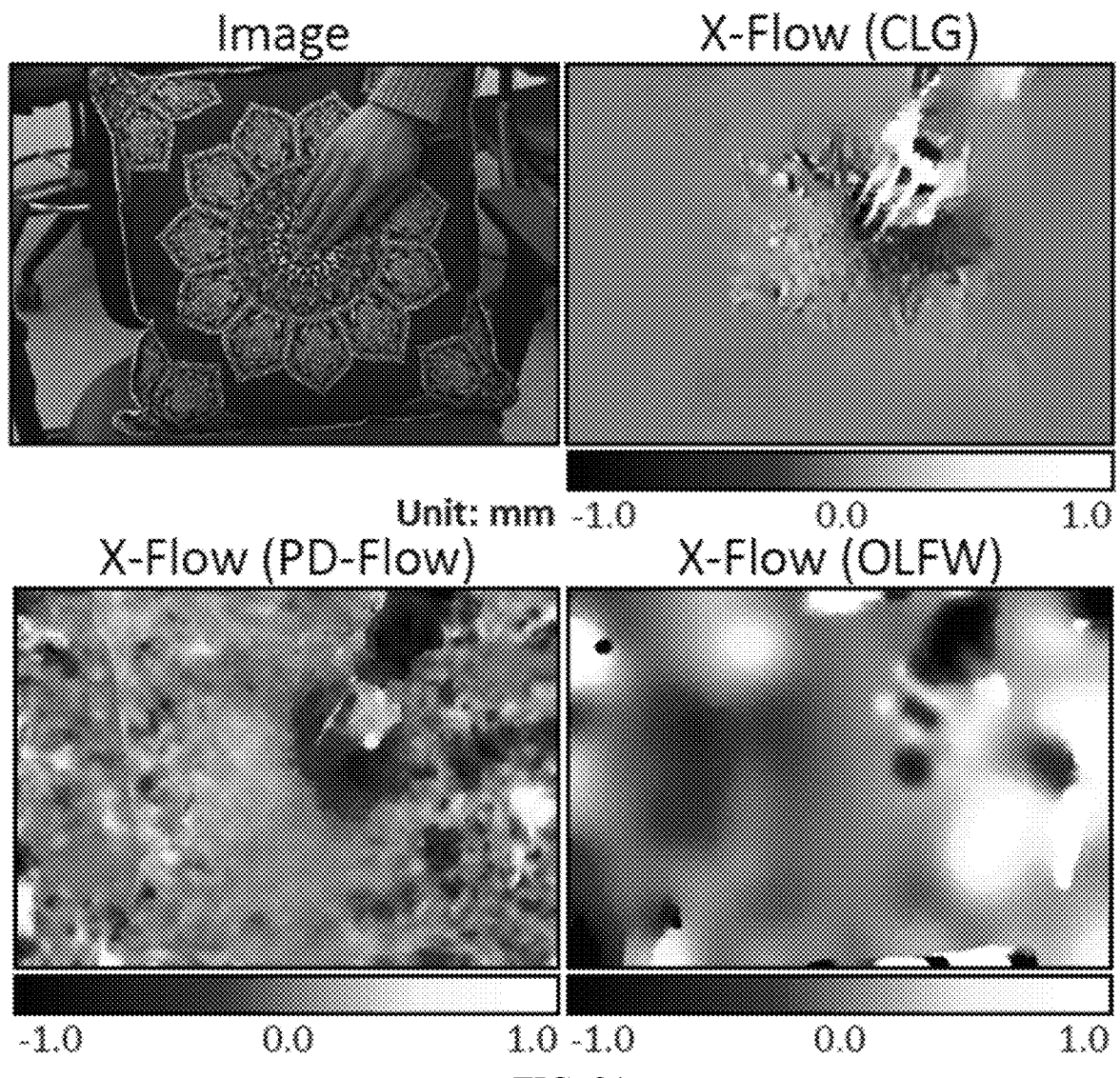
FIG. 21 shows an example of a scene with multiple objects moving and deforming in a complex manner, and a comparison of motion in the scene calculated using techniques in accordance with some embodiments of the disclosed subject matter to motion in the scene calculated using other techniques.

FIG. 21 shows an example of a scene with multiple objects moving and deforming in a complex manner, and a comparison of motion in the scene calculated using techniques in accordance with some embodiments of the disclosed subject matter to motion in the scene calculated using other techniques. As shown in FIG. 21, motion was calculated for a scene including a hand that is depressing the center of an embroidered pillow using the same techniques used to calculate motion in FIG. 17. FIG. 21 shows that for the complex motions taking place in the scene, CLG accurately measured small (e.g., less than 1 mm) X-motion movements. By contrast, PD-Flow and OLFW generated very noisy motion measurements, including many erroneous measurements for portions of the scene that had exhibited no X-motion.

Figure 22:
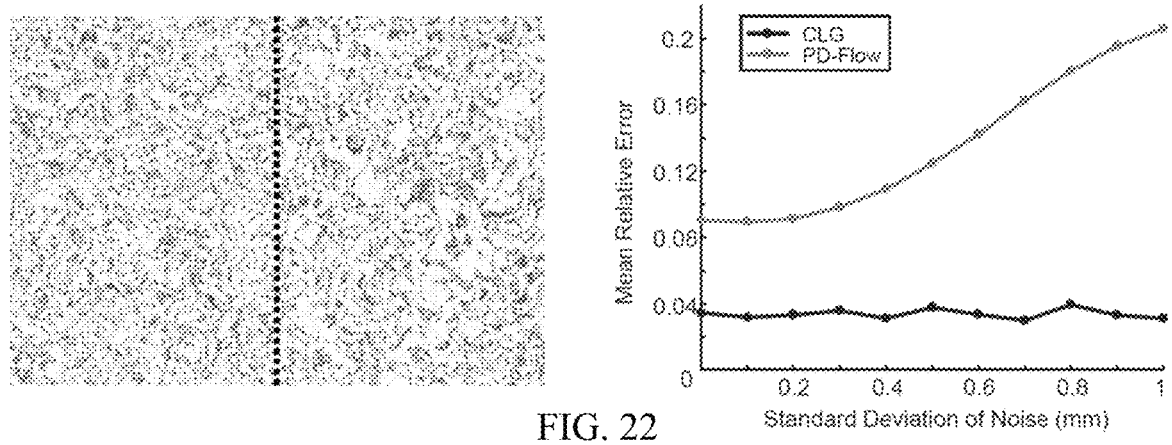
FIG. 22 shows an example of a simulated scene, and mean relative error generated during an estimate of motion of the scene when various levels of noise were present.

FIG. 22 shows an example of a simulated scene, and mean relative error generated during an estimate of motion of the scene when various levels of noise were present. As shown in FIG. 22, the mean relative error generated by CLG remained relatively steady with increasing noise, whereas the mean relative error generated by PD-Flow increased in proportion with the noise. This is because PD-Flow relies on explicitly computing change in depth in order to calculate motion by calculating changes in depth, while CLG estimates Z-motion directly.

Figure 23:
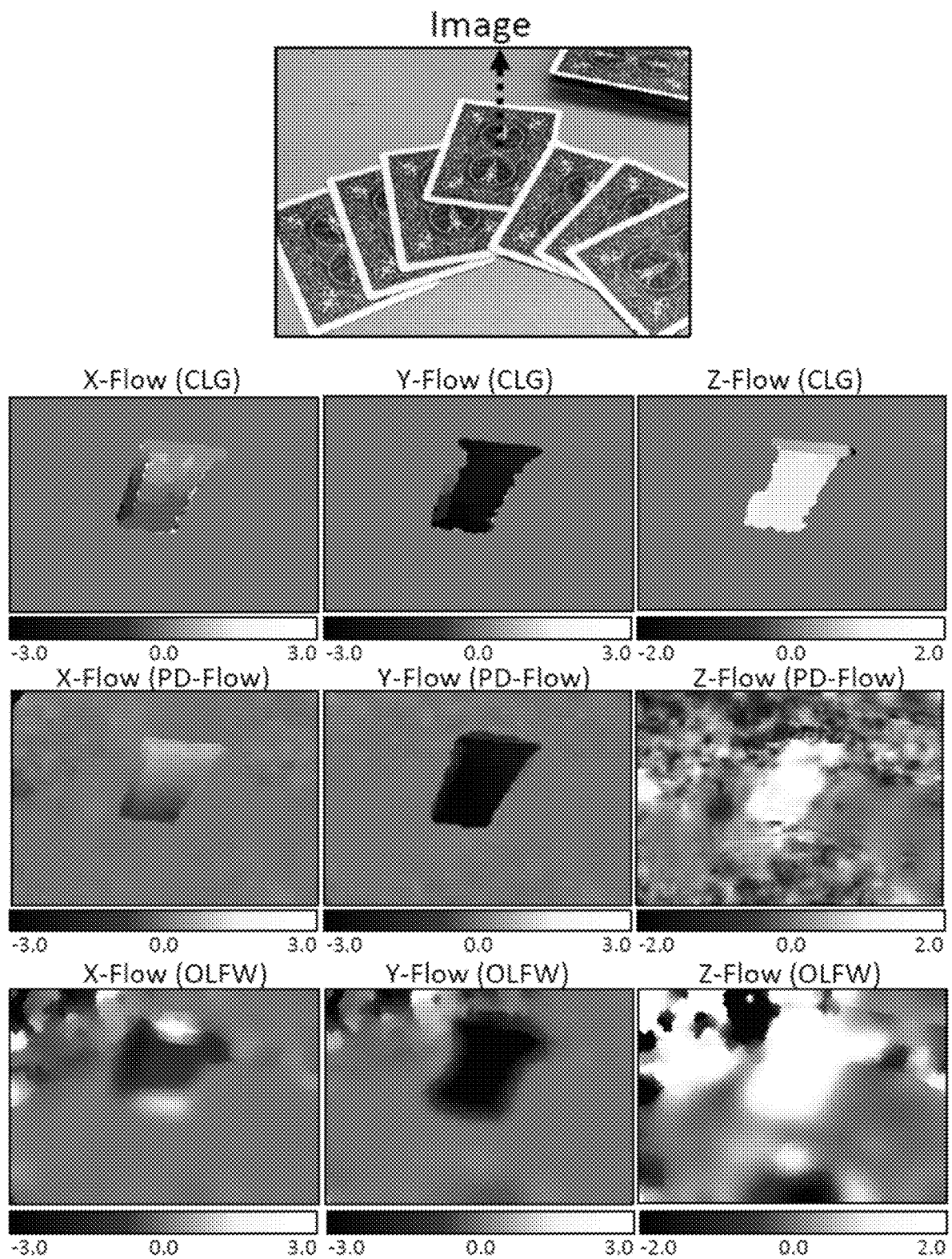
FIGS. 23-29 show additional examples of scenes in which one or more portions of the scene move, and comparisons of motion in the scene calculated using techniques in accordance with some embodiments of the disclosed subject matter to motion in the scene calculated using other techniques.

FIG. 23 shows an example of a scene with multiple objects occluding a moving object, and a comparison of motion in the scene calculated using techniques in accordance with some embodiments of the disclosed subject matter to motion in the scene calculated using other techniques. As shown in FIG. 23, motion was calculated for a scene including several cards, one of which is moving using the same techniques used to calculate motion in FIG. 17. FIG. 23 shows that for the occluded motion of the center card, CLG accurately measured small motions along all three axes. By contrast, PD-Flow and OLFW generated noisier motion measurements, especially in the Z direction.

Figure 24:
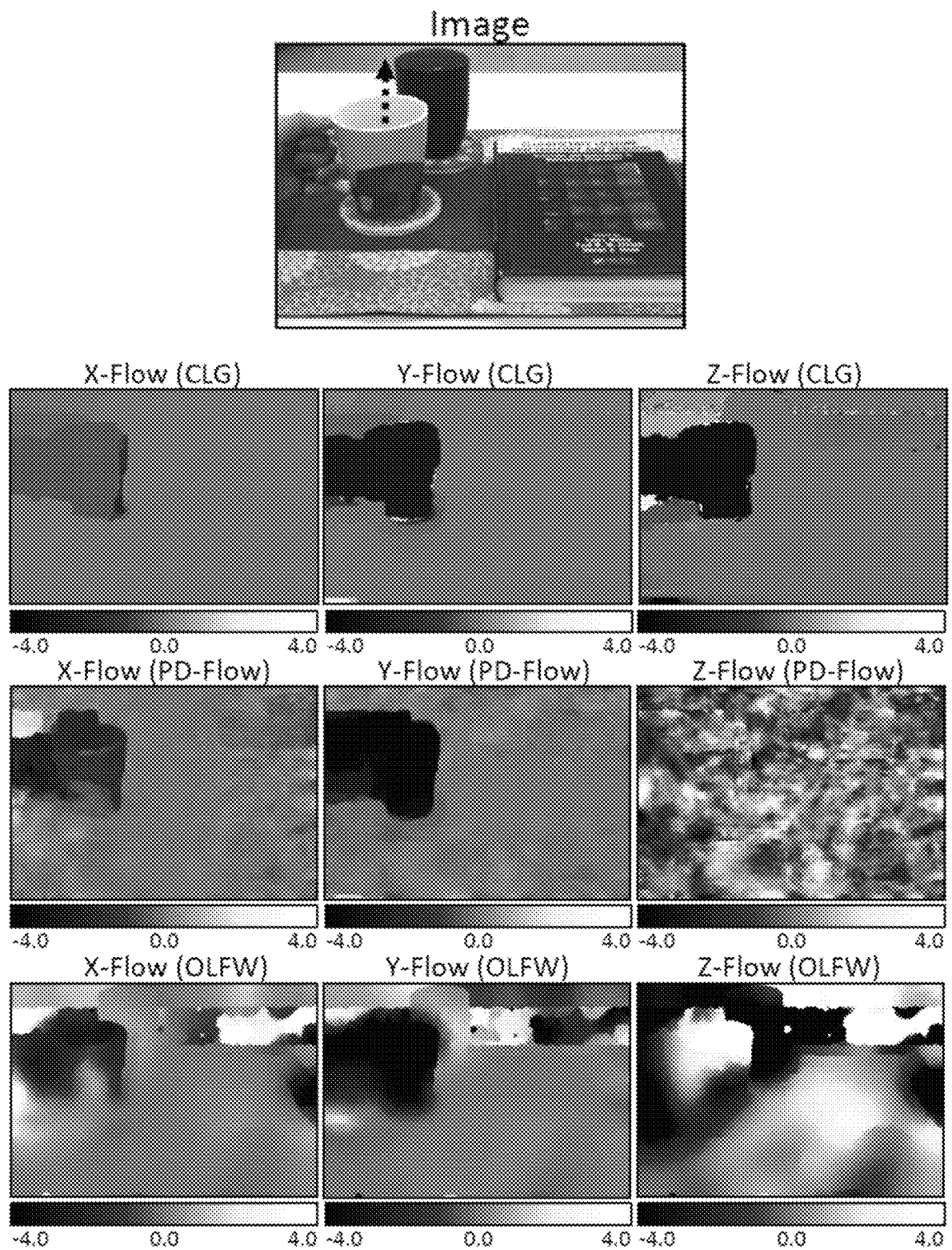

FIG. 24 shows an example of a natural scene with a moving object and occlusions, and a comparison of motion in the scene calculated using techniques in accordance with some embodiments of the disclosed subject matter to motion in the scene calculated using other techniques. As shown in FIG. 24, motion was calculated for a scene including various objects, with a person lifting a mug using the same techniques used to calculate motion in FIG. 17. FIG. 24 shows that for the natural scene, CLG accurately measured small motions along all three axes. By contrast, PD-Flow and OLFW generated noisier motion measurements, especially in the Z direction.

Figure 25:
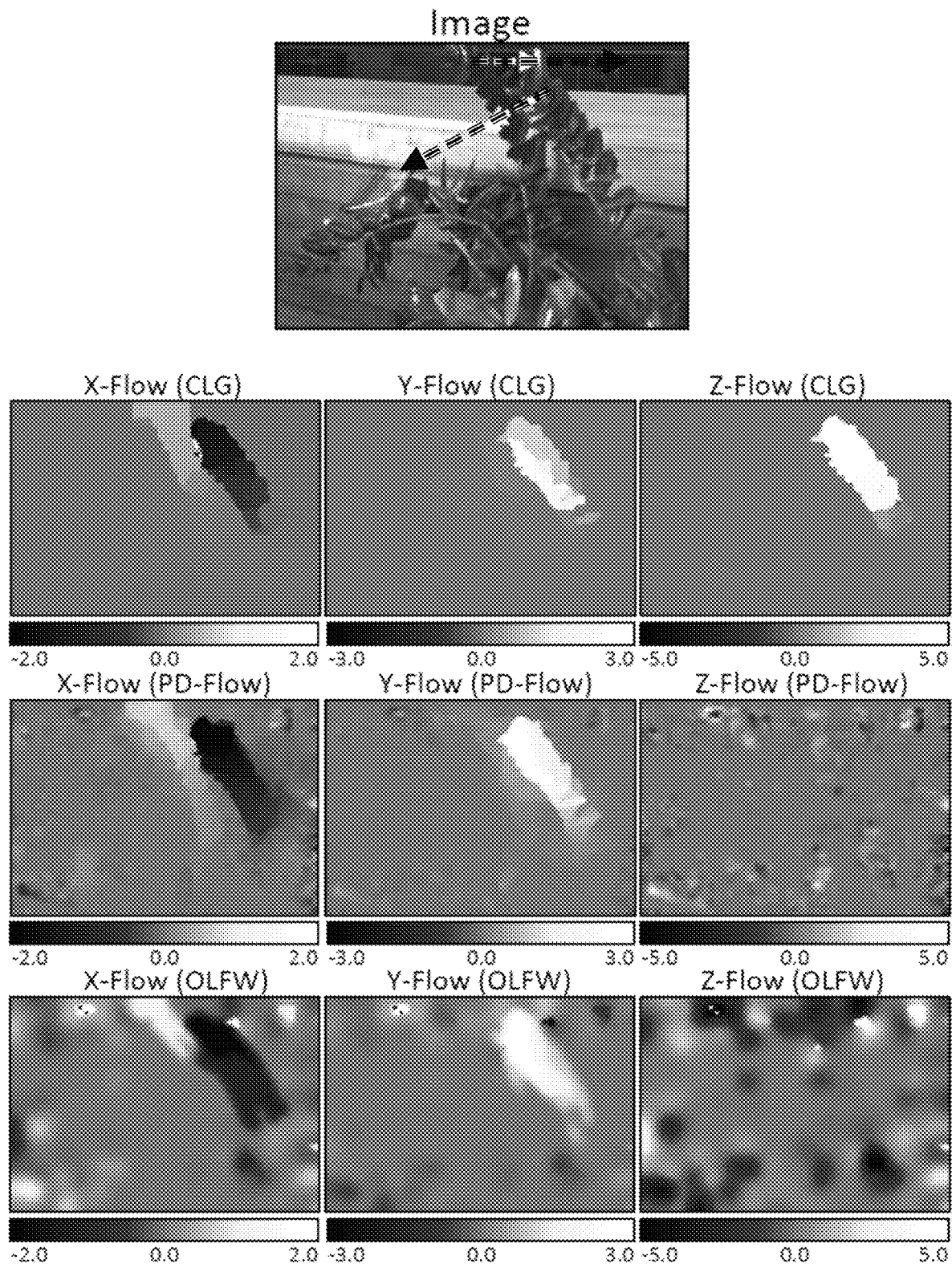

FIG. 25 shows an example of a scene with multiple complex objects moving independently in an environment with occlusions, and a comparison of motion in the scene calculated using techniques in accordance with some embodiments of the disclosed subject matter to motion in the scene calculated using other techniques. As shown in FIG. 25, motion was calculated for a scene including branches moving in the wind using the same techniques used to calculate motion in FIG. 17. FIG. 25 shows that for the complex partially occluded motion of the branches, CLG accurately measured small motions along all three axes. By contrast, PD-Flow and OLFW produced relatively noisy measurements, especially in the Z direction in which these techniques generated very little useful information.

Figure 26:
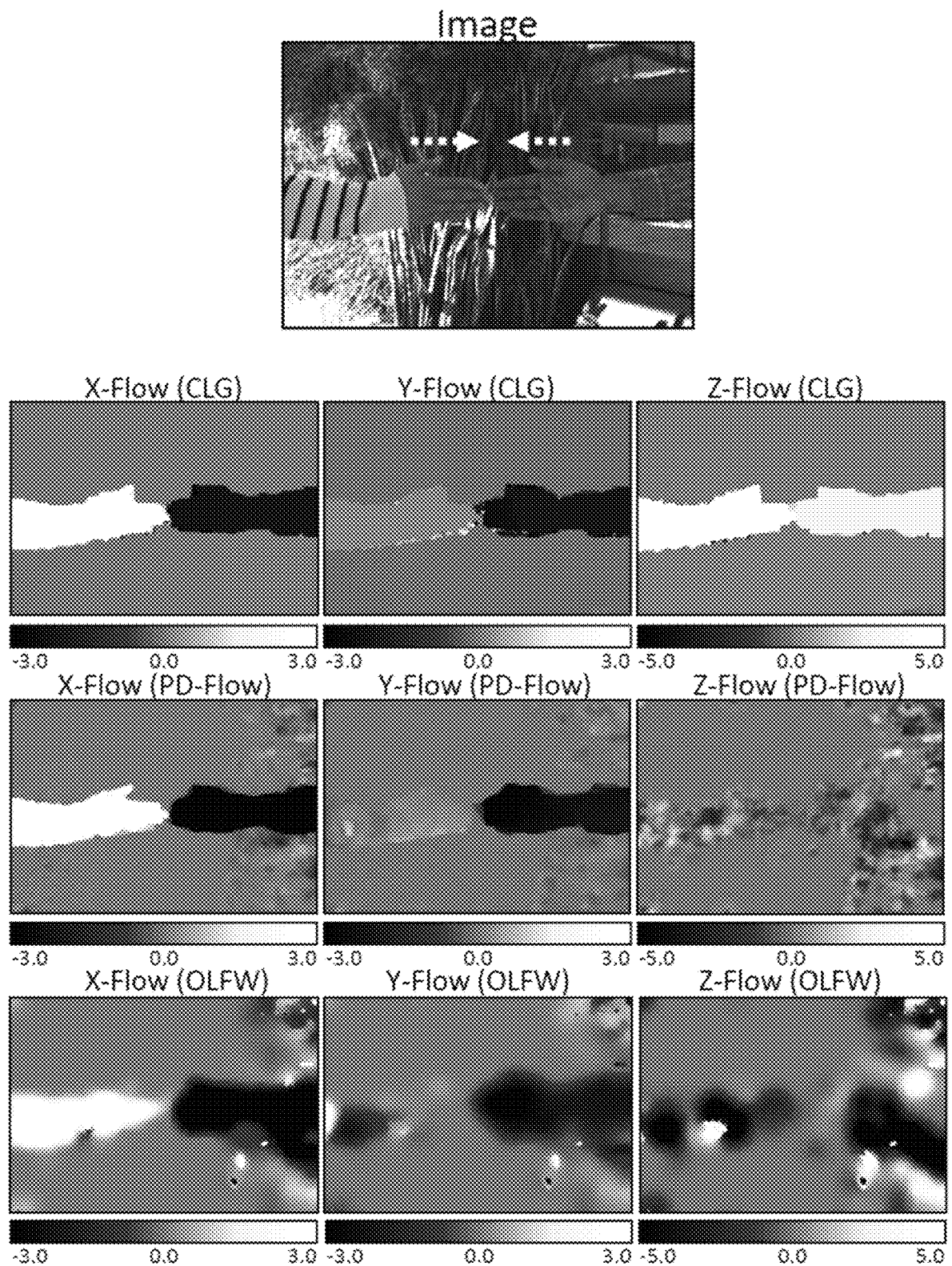

FIG. 26 shows an example of a scene in which two humans interact by shaking hands, and a comparison of motion in the scene calculated using techniques in accordance with some embodiments of the disclosed subject matter to motion in the scene calculated using other techniques. As shown in FIG. 26, motion was calculated for a scene including two humans shaking hands, with the hands moving toward one another using the same techniques used to calculate motion in FIG. 17. FIG. 26 shows that for the human movements, CLG accurately measured small motions along all three axes. By contrast, PD-Flow and OLFW generated noisier motion measurements, especially in the Z direction.

Figure 27:
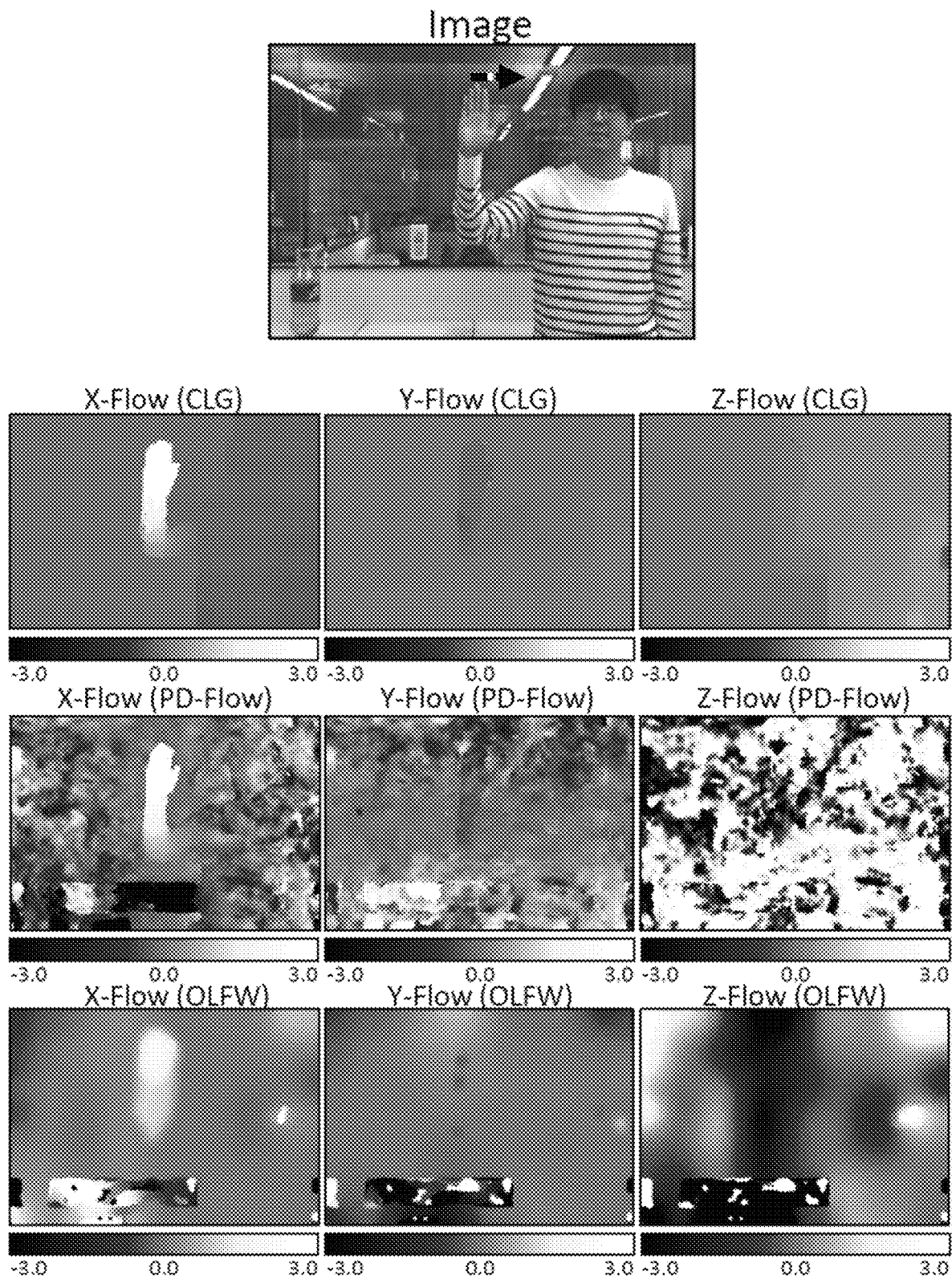

FIG. 27 shows an example of a scene in which a human is waiving by moving a hand primarily along the X direction, and a comparison of motion in the scene calculated using techniques in accordance with some embodiments of the disclosed subject matter to motion in the scene calculated using other techniques. As shown in FIG. 27, motion was calculated for a scene a waiving hand, with the hand moving primarily back and forth in the X direction using the same techniques used to calculate motion in FIG. 17. FIG. 27 shows that for the human movement, CLG accurately measured small motions along all three axes. By contrast, PD-Flow and OLFW produced relatively noisy measurements, especially in the Z direction in which these techniques generated very little useful information.

Figure 28:
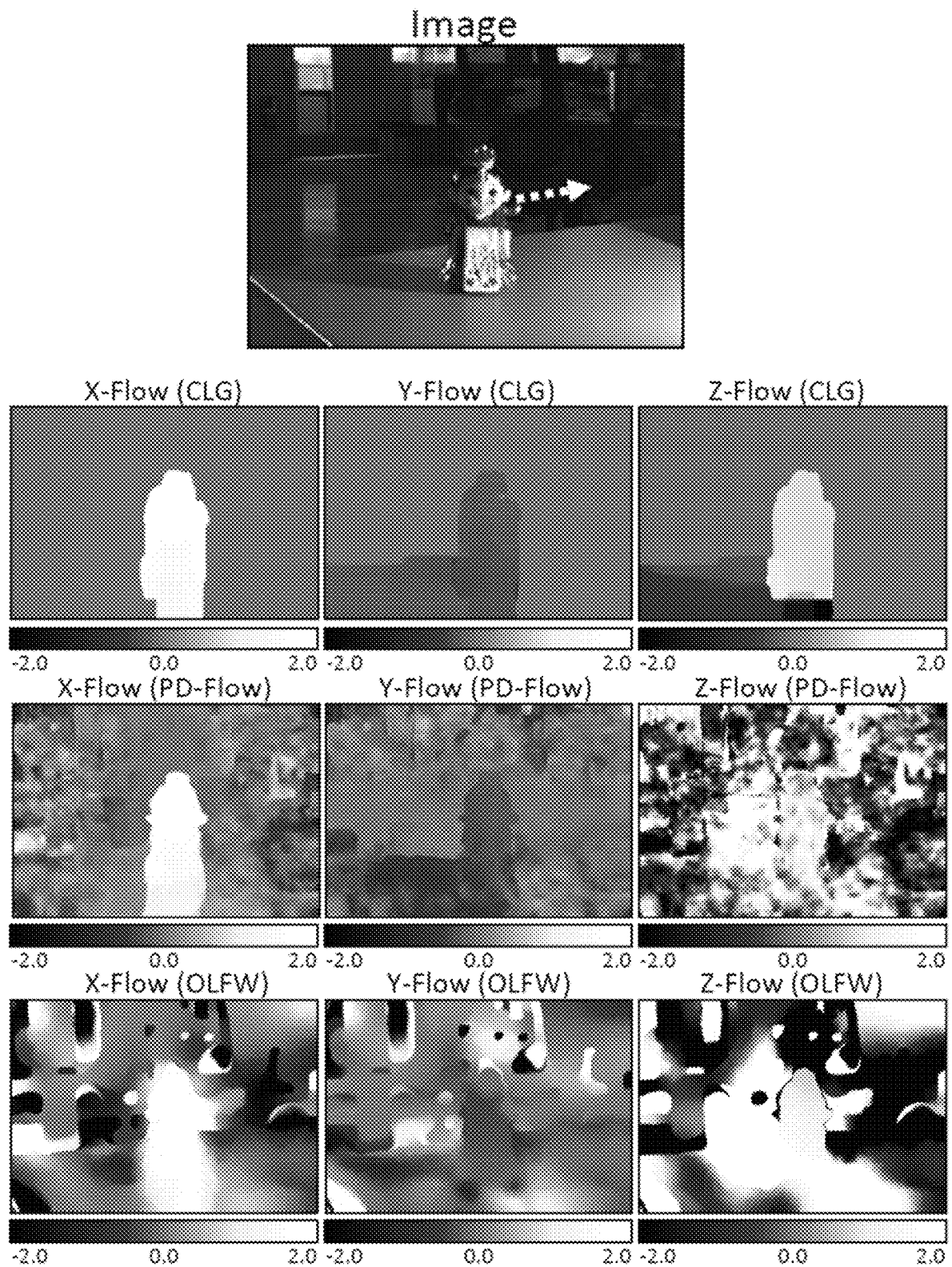

FIG. 28 shows an example of a scene with relatively poor lighting conditions (dim, and light projecting primarily from a single direction), and a comparison of motion in the scene calculated using techniques in accordance with some embodiments of the disclosed subject matter to motion in the scene calculated using other techniques. As shown in FIG. 28, motion of the figuring was calculated, with the figurine moving to the right and away from the camera in the Z direction using the same techniques used to calculate motion in FIG. 17. FIG. 28 shows that for the poorly lit figurine, CLG accurately measured small motions along all three axes. By contrast, PD-Flow and OLFW produced relatively noisy measurements, especially in the Z direction in which these techniques generated very little useful information.

Figure 29:
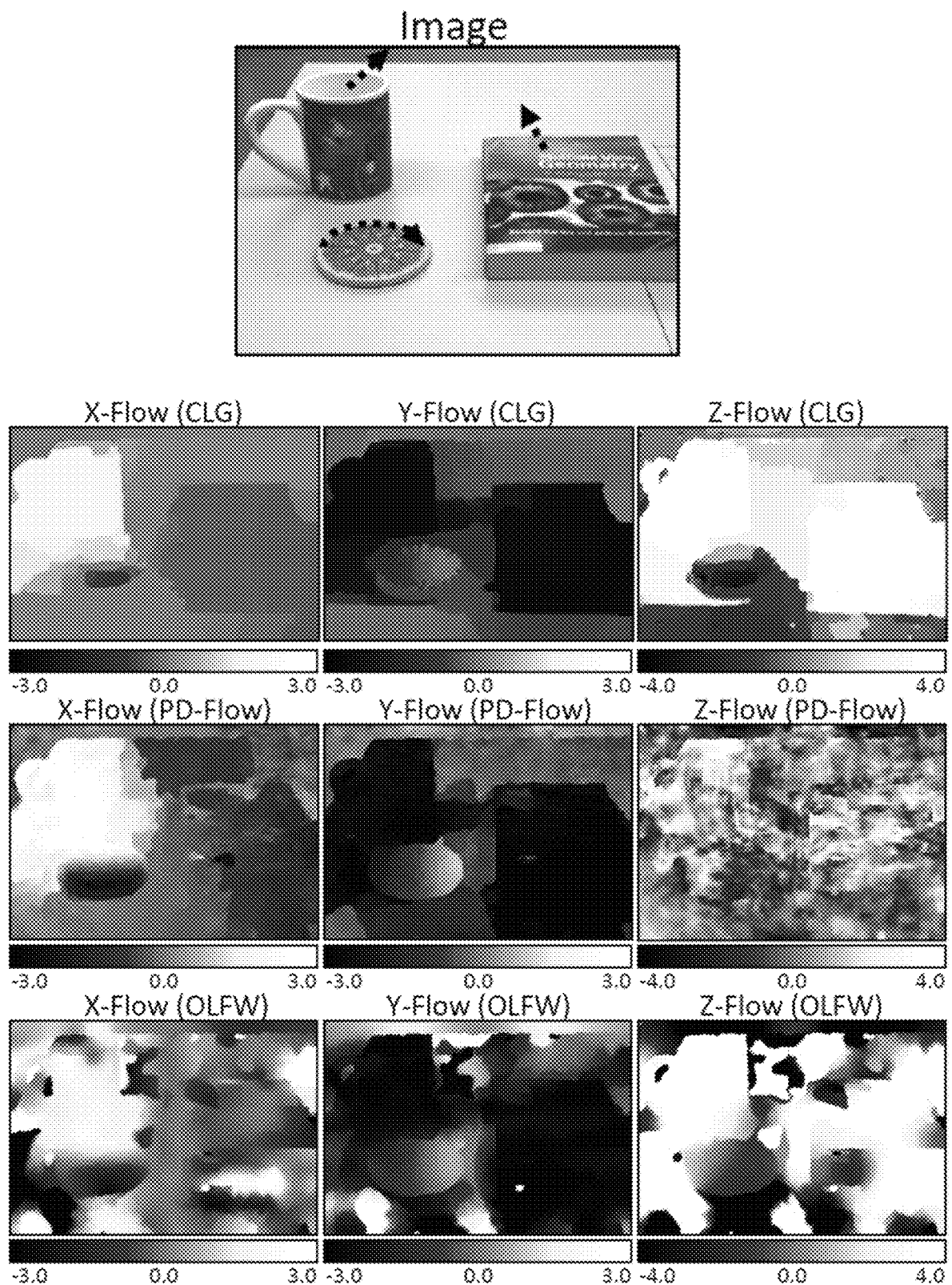

FIG. 29 shows an example of a scene with relatively poor lighting conditions (objects moving in shadow against a relatively uniform background), and a comparison of motion in the scene calculated using techniques in accordance with some embodiments of the disclosed subject matter to motion in the scene calculated using other techniques. As shown in FIG. 29, motion of the objects was calculated, with the objects moving in various directions using the same techniques used to calculate motion in FIG. 17. FIG. 29 shows that for the poorly lit figurine, CLG much more accurately measured motions along all three axes in comparison to PD-Flow and OLFW, which produced very noise measurements, especially in the Z direction.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 5-8 can be executed or performed in any order or sequence not limited to the order and sequence shown and described in the figures. Also, some of the above steps of the processes of FIGS. 5-8 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for three dimensional motion estimation, the system comprising:
    an image sensor;
    optics configured to create a plurality of images of a scene, wherein the optics comprises:
        focusing optics disposed between the scene and the image sensor; and
        an array comprising a plurality of microlenses disposed between the image sensor and the focusing optics, each of the plurality of microlenses projecting one of the plurality of images of the scene onto the image sensor as a sub-aperture image; and
    one or more hardware processors that are configured to:
        cause the image sensor to capture at least a first sub-aperture image of the scene and a second sub-aperture image of the scene at a first time, wherein the first sub-aperture image is projected by a first microlens of the plurality of microlenses, and the second sub-aperture image is projected by a second microlens of the plurality of microlenses that is adjacent to the first microlens such that at least a portion of the first sub-aperture image and the second sub-aperture image represent the same portion of the scene;
        generate a first light field using a first plurality of sub-aperture images of the scene including the first sub-aperture image and the second sub-aperture image;
        cause the image sensor to capture at least a third sub-aperture image of the scene at a second time, wherein the second time is subsequent to the first time;
        generate a second light field using a second plurality of images of the scene including the third sub-aperture image;
        calculate light field gradients using information from the first light field and information from the second light field; and
        calculate, for each point in the scene, three dimensional motion using the light field gradients by applying a constraint to the motion in the scene.

2. The system of claim 1, wherein the one or more hardware processors are further configured to:
    generate, for each of a plurality of rays in the first light field, a first matrix A of light field gradients that includes light field gradients corresponding to rays in a local neighborhood of the ray, wherein A is an n×3 matrix where n is the number of rays in the local neighborhood;
    generate, for each of the plurality of rays in the first light field, a second matrix b of temporal light field derivatives that includes the additive inverses of temporal light field derivatives corresponding to the rays in the local neighborhood of the ray, wherein b is a n×1 matrix;
    calculate, for each of the plurality of rays, a three element velocity vector V, such that $V=(A^TA)^{-1}A^Tb$, where the local neighborhood of rays are assumed to have the same velocity; and
    calculate motion in the scene based on the velocity vector V calculated for each of the plurality of rays.

3. The system of claim 1, wherein the one or more hardware processors are further configured to calculate, for each point in the scene, three dimensional motion by determining a k×3 velocity matrix V by finding a velocity vector V that minimizes the relationship: $(L_0 (x)-L_1(w(x, V)))^2$, where $L_0$ is the first light field, and $L_1$ is the second light field, and w(x, V) is a warp function that is represented as $$w(x, V) = \left(x+V_X - \frac{u}{\Gamma}V_Z, y+V_Y - \frac{v}{\Gamma}V_Z, u, v\right), V_X, V_Y, \text{ and } V_Z$$

are the velocities in the X, Y, and Z directions respectively, x has coordinates (x, y, u, v), and $\Gamma$ is the depth in the Z direction of the plane used to define the light field.

4. The system of claim 1, wherein the one or more hardware processors are further configured to find velocity vectors V for a plurality of light field coordinates that minimize a global functional E(V) that includes a smoothness term that penalizes departures from smoothness.

5. The system of claim 4, wherein the one or more hardware processors are further configured to find the velocity vectors V for each of the plurality of light field coordinates that minimize the global functional E(V) by solving a set of Euler-Lagrange equations using successive over-relaxation.

6. The system of claim 4, wherein the smoothness term includes a quadratic penalty functions $\lambda$ and $\lambda_Z$, where $\lambda_Z < \lambda$.

7. The system of claim 4, wherein the smoothness term includes a generalized Charbonier function $\rho(x)=(x^2+\epsilon^2)^a$.

8. The system of claim 1, wherein the one or more hardware processors are further configured to find a velocity V that minimizes a functional that includes:
    a local term ($E_D$ (V)) that aggregates information from a plurality of rays emitted from the same scene point S that were detected in the first light field; and
    a smoothness term ($E_S$(V)) that penalizes departures from smoothness.

9. A method for three dimensional motion estimation, the method comprising:
    causing an image sensor to capture at least a first sub-aperture image of a scene and a second sub-aperture image of the scene at a first time, wherein the first sub-aperture image and the second sub-aperture image are formed on the image sensor via optics configured to create a plurality of images of the scene, wherein the optics comprises:
        focusing optics disposed between the scene and the image sensor; and an array comprising a plurality of microlenses disposed between the image sensor and the focusing optics, each of the plurality of microlenses projecting one of the plurality of images of the scene onto the image sensor as a sub-aperture image, wherein the first sub-aperture image is projected by a first microlens of the plurality of microlenses, and the second sub-aperture image is projected by a second microlens of the plurality of microlenses that is adjacent to the first microlens such that at least a portion of the first sub-aperture image and the second sub-aperture image represent the same portion of the scene;

generating a first light field using a first plurality of sub-aperture images of the scene including the first sub-aperture image and the second sub-aperture image;

causing the image sensor to capture at least a third sub-aperture image of the scene at a second time, wherein the second time is subsequent to the first time and the second image is formed on the image sensor via the optics configured to create a plurality of images of the scene;

generating a second light field using a second plurality of images of the scene including the third sub-aperture image;

calculating light field gradients using information from the first light field and information from the second light field; and calculating, for each point in the scene, three dimensional motion using the light field gradients by applying a constraint to the motion in the scene.

10. The method of claim 9, further comprising:

generating, for each of a plurality of rays in the first light field, a first matrix A of light field gradients that includes light field gradients corresponding to rays in a local neighborhood of the ray, wherein A is an n×3 matrix where n is the number of rays in the local neighborhood;

generating, for each of the plurality of rays in the first light field, a second matrix b of temporal light field derivatives that includes the additive inverses of temporal light field derivatives corresponding to the rays in the local neighborhood of the ray, wherein b is a n×1 matrix;

calculating, for each of the plurality of rays, a three element velocity vector V, such that $V=(A^T A)^{-1} A^T b$, where the local neighborhood of rays are assumed to have the same velocity; and calculating motion in the scene based on the velocity vector V calculated for each of the plurality of rays.

11. The method of claim 9, further comprising calculating, for each point in the scene, three dimensional motion by determining a k×3 velocity matrix V by finding a velocity vector V that minimizes the relationship: $(L_0(x)-L_1(w(x,V)))^2$, where $L_0$ is the first light field, and $L_1$ is the second light field, and $w(x, V)$ is a warp function that is represented as $$w(x, V) = \left(x + V_X - \frac{u}{\Gamma}V_Z, y + V_Y - \frac{v}{\Gamma}V_Z, u, v\right), V_X, V_Y, \text{ and } V_Z$$

are the velocities in the X, Y, and Z directions respectively, x has coordinates (x, y, u, v), and $\Gamma$ is the depth in the Z direction of the plane used to define the light field.

12. The method of claim 9, further comprising finding velocity vectors V for a plurality of light field coordinates that minimize a global functional E(V) that includes a smoothness term that penalizes departures from smoothness.

13. The method of claim 12, further comprising finding the velocity vectors V for the plurality of light field coordinates that minimize the global functional E(V) by solving a set of Euler-Lagrange equations using successive over-relaxation.

14. The method of claim 12, wherein the smoothness term includes a quadratic penalty functions $\lambda$ and $\lambda_Z$, where $\lambda_Z < \lambda$.

15. The method of claim 12, wherein the smoothness term includes a generalized Charbonier function $\rho(x)=(x^2+\epsilon^2)^a$.

16. The method of claim 9, further comprising finding a velocity V that minimizes a functional that includes:

a local term ($E_D(V)$) that aggregates information from a plurality of rays emitted from the same scene point S that were detected in the first light field; and a smoothness term ($E_S(V)$) that penalizes departures from smoothness.

17. A non-transitory computer readable medium containing computer executable instructions that, when executed by a processor, cause the processor to perform a method for three dimensional motion estimation, the method comprising:

causing an image sensor to capture at least a first sub-aperture image of a scene and a second-sub-aperture image of the scene at a first time, wherein the first sub-aperture image and the second sub-aperture image are formed on the image sensor via optics configured to create a plurality of images of the scene, wherein the optics comprises:

focusing optics disposed between the scene and the image sensor; and an array comprising a plurality of microlenses disposed between the image sensor and the focusing optics, each of the plurality of microlenses projecting one of the plurality of images of the scene onto the image sensor as a sub-aperture image, wherein the first sub-aperture image is projected by a first microlens of the plurality of microlenses, and the second sub-aperture image is projected by a second microlens of the plurality of microlenses that is adjacent to the first microlens such that at least a portion of the first sub-aperture image and the second sub-aperture image represent the same portion of the scene;

generating a first light field using a first plurality of sub-aperture images of the scene including the first sub-aperture image and the second sub-aperture image;

causing the image sensor to capture at least a third sub-aperture image of the scene at a second time, wherein the second time is subsequent to the first time and the first image is formed on the image sensor via optics configured to create a plurality of images of the scene;

generating a second light field using a second plurality of images of the scene including the third sub-aperture image;

calculating light field gradients using information from the first light field and information from the second light field; and calculating, for each point in the scene, three dimensional motion using the light field gradients by applying a constraint to the motion in the scene.

18. The non-transitory computer-readable medium of claim 17, wherein the method further comprises:

generating, for each of a plurality of rays in the first light field, a first matrix A of light field gradients that includes light field gradients corresponding to rays in a local neighborhood of the ray, wherein A is an n×3 matrix where n is the number of rays in the local neighborhood;

generating, for each of the plurality of rays in the first light field, a second matrix b of temporal light field derivatives that includes the additive inverses of temporal light field derivatives corresponding to the rays in the local neighborhood of the ray, wherein b is a n×1 matrix;

calculating, for each of the plurality of rays, a three element velocity vector V, such that $V=(A^TA)^{-1}A^Tb$, where the local neighborhood of rays are assumed to have the same velocity; and calculating motion in the scene based on the velocity vector V calculated for each of the plurality of rays.

19. The non-transitory computer-readable medium of claim 17, wherein the method further comprises calculating, for each point in the scene, three dimensional motion by determining a k×3 velocity matrix V by finding a velocity vector V that minimizes the relationship: $(L_0(x)-L_1(w(x,V)))^2$, where $L_0$ is the first light field, and $L_1$ is the second light field, and $w(x, V)$ is a warp function that is represented as $$w(x, V) = \left(x + V_X - \frac{u}{\Gamma}V_Z, y + V_Y - \frac{v}{\Gamma}V_Z, u, v\right), V_X, V_Y, \text{ and } V_Z$$

are the velocities in the X, Y, and Z directions respectively, x has coordinates (x, y, u, v), and $\Gamma$ is the depth in the Z direction of the plane used to define the light field.

20. The non-transitory computer-readable medium of claim 17, wherein the method further comprises finding velocity vectors V for a plurality of light field coordinates that minimize a global functional E(V) that includes a smoothness term that penalizes departures from smoothness.

21. The non-transitory computer-readable medium of claim 20, wherein the method further comprises finding the velocity vectors V for the plurality of light field coordinates that minimize the global functional E(V) by solving a set of Euler-Lagrange equations using successive over-relaxation.

22. The non-transitory computer-readable medium of claim 20, wherein the smoothness term includes a quadratic penalty functions $\lambda$ and $\lambda_Z$, where $\lambda_Z<\lambda$.

23. The non-transitory computer-readable medium of claim 20, wherein the smoothness term includes a generalized Charbonier function $\rho(x)=(x^2+\epsilon^2)^a$.

24. The non-transitory computer-readable medium of claim 17, wherein the method further comprises finding a velocity V that minimizes a functional that includes:

a local term ($E_D(V)$) that aggregates information from a plurality of rays emitted from the same scene point S that were detected in the first light field; and a smoothness term ($E_S(V)$) that penalizes departures from smoothness.

* * * * *

UNITED STATES PATENT AND TRADEMARK OFFICE
CERTIFICATE OF CORRECTION

PATENT NO. : 10,706,564 B2
APPLICATION NO. : 15/951131
DATED : July 7, 2020
INVENTOR(S) : Mohit Gupta et al.

Page 1 of 2

It is certified that error appears in the above-identified patent and that said Letters Patent is hereby corrected as shown below:

In the Specification

Column 15, Eq. (7), "
$$S = \begin{bmatrix} \sum_{i=1}^{n} L_{X_i}^2 & \sum_{i=1}^{n} L_{X_i} L_{Y_i} & \sum_{i=1}^{n} L_{X_i} L_{Z_i} \\ \sum_{i=1}^{n} L_{Y_i} L_{X_i} & \sum_{i=1}^{n} L_{Y_i}^2 & \sum_{i=1}^{n} L_{Y_i} L_{Z_i} \\ \sum_{i=1}^{n} L_{Z_i} L_{X_i} & \sum_{i=1}^{n} L_{Z_i} L_{Y_i} & \sum_{i=1}^{n} L_{Z_i}^2 \end{bmatrix}$$
" should be $$-- S = \begin{bmatrix} \sum_{i=1}^{n} L_{X_i}^2 & \sum_{i=1}^{n} L_{X_i} L_{Y_i} & \sum_{i=1}^{n} L_{X_i} L_{Z_i} \\ \sum_{i=1}^{n} L_{Y_i} L_{X_i} & \sum_{i=1}^{n} L_{Y_i}^2 & \sum_{i=1}^{n} L_{Y_i} L_{Z_i} \\ \sum_{i=1}^{n} L_{Z_i} L_{X_i} & \sum_{i=1}^{n} L_{Z_i} L_{Y_i} & \sum_{i=1}^{n} L_{Z_i}^2 \end{bmatrix} --.$$

Column 17, Eq. (13), "$E_S(V) = \int_\Omega g(x)(\lambda \Sigma_{i=1}^{4} \rho_s (V_{X(i)}^2) + \lambda \Sigma_{i=1}^{4} \rho_s (V_{Y(i)}^2) + \lambda_z \Sigma_{i=1}^{4} \rho_s (V_{Z(i)}^2)) dx$,"
should be -- $E_S(V) = \int_\Omega g(x)\left(\lambda \sum_{i=1}^{4} \rho_s (v_{X(i)}^2) + \lambda \sum_{i=1}^{4} \rho_s (v_{Y(i)}^2) + \lambda_z \sum_{i=1}^{4} \rho_s (vZ_{Y(i)}^2)\right) dx$ --.

Column 18, Eq. (16), "
$$\rho_D' L_X (L_X V_X + L_Y V_Y + L_Z V_Z) - \lambda \sum_{i=1}^{4} \frac{\partial}{\partial_X^{(i)}} (g \rho_s' (V_{X(i)}) V_{X(i)}) = -\rho_D' L_X L_t$$
$$\rho_D' L_Y (L_X V_X + L_Y V_Y + L_Z V_Z) - \lambda \sum_{i=1}^{4} \frac{\partial}{\partial_X^{(i)}} (g \rho_s' (V_{Y(i)}) V_{Y(i)}) = -\rho_D' L_Y L_t$$
$$\rho_D' L_Z (L_X V_X + L_Y V_Y + L_Z V_Z) - \lambda_z \sum_{i=1}^{4} \frac{\partial}{\partial_X^{(i)}} (g \rho_s' (V_{Z(i)}) V_{Z(i)}) = -\rho_D' L_Z L_t$$
"

Signed and Sealed this
Sixth Day of October, 2020

Andrei Iancu
*Director of the United States Patent and Trademark Office*

CERTIFICATE OF CORRECTION (continued)
U.S. Pat. No. 10,706,564 B2 should be --
$$\rho_D' L_X (L_X V_X + L_Y V_Y + L_Z V_Z) - \lambda \sum_{i=1}^{4} \frac{\partial}{\partial_X^{(i)}} (g \rho_S' (V_{X(i)}) V_{X(i)}) = -\rho_D' L_X L_t$$
$$\rho_D' L_Y (L_X V_X + L_Y V_Y + L_Z V_Z) - \lambda \sum_{i=1}^{4} \frac{\partial}{\partial_X^{(i)}} (g \rho_S' (V_{Y(i)}) V_{Y(i)}) = -\rho_D' L_Y L_t$$
$$\rho_D' L_Z (L_X V_X + L_Y V_Y + L_Z V_Z) - \lambda_Z \sum_{i=1}^{4} \frac{\partial}{\partial_X^{(i)}} (g \rho_S' (V_{Z(i)}) V_{Z(i)}) = -\rho_D' L_Z L_t$$
--.

Column 19, Eq. (19), " $E_D(V) = \int_{\Omega_C} \Sigma_{x_i \in \mathcal{P}(u,v)} (L_{Xi} V_X + L_{Yi} V_Y + L_{Zi} V_Z + L_{ti})^2 du\, dv$ " should be
-- $E_D(V) = \int_{\Omega_C} \Sigma_{x_i \in \mathcal{P}(u,v)} (L_{Xi} V_X + L_{Yi} V_Y + L_{Zi} V_Z + L_{ti})^2 du\, dv$ --.

Column 20, Eq. (21), " $E_D(V) = \int_{\Omega_C} \Sigma_{x_i \in \mathcal{P}(u,v)} h_i \rho_D ((L_0(x_i) - L_1(w(x_i, V)))^2 du\, dv$ " should be
-- $E_D(V) = \int_{\Omega_C} \Sigma_{x_i \in \mathcal{P}(u,v)} h_i \rho_D \left((L_0(x_i) - L_1(w(x_i, V)))\right)^2 du\, dv$ --.

Column 21, Eq. (25),

" $E_S(V) = \int_{\Omega_C} g(x)(\lambda \sum_{i=1}^{2} \rho_S(V_{X(i)}^2) + \lambda \sum_{i=1}^{2} \rho_S(V_{Y(i)}^2) + \lambda_Z \sum_{i=1}^{2} \rho_S(V_{Z(i)}^2)) du\, dv$ " should be
-- $E_S(V) = \int_{\Omega_C} g(x)\left(\lambda \sum_{i=1}^{2} \rho_S(V_{X(i)}^2) + \lambda \sum_{i=1}^{2} \rho_S(V_{Y(i)}^2) + \lambda_Z \sum_{i=1}^{2} \rho_S(V_{Z(i)}^2)\right) du\, dv$ --.

Column 21, Eq. (29), " $E_D(V) = \int_{\Omega_C} \Sigma_{x_i \in \mathcal{P}(u,v)} h_i \rho_D ((L_{Xi} V_X + L_{Yi} V_Y + L_{Zi} V_Z + L_{ti})^2) du\, dv$ " should be
-- $E_D(V) = \int_{\Omega_C} \Sigma_{x_i \in \mathcal{P}(u,v)} h_i \rho_D ((L_{Xi} V_X + L_{Yi} V_Y + L_{Zi} V_Z + L_{ti})^2) du\, dv$ --.

Column 21-22, Eq. 30,

"
$$\sum_{x_i \in \mathcal{P}(u,v)} h_i \rho_D' L_X L_D - \lambda \sum_{i=1}^{2} \frac{\partial}{\partial u^{(i)}} (g \rho_S' (V_{X(i)} V_{X(i)})) = -\sum_{X_i \in \mathcal{P}(u,v)} h_i \rho_D' L_X L_t$$
$$\sum_{x_i \in \mathcal{P}(u,v)} h_i \rho_D' L_Y L_D - \lambda \sum_{i=1}^{2} \frac{\partial}{\partial u^{(i)}} (g \rho_S' (V_{Y(i)} V_{Y(i)})) = -\sum_{X_i \in \mathcal{P}(u,v)} h_i \rho_D' L_Y L_t$$
$$\sum_{x_i \in \mathcal{P}(u,v)} h_i \rho_D' L_Z L_D - \lambda_Z \sum_{i=1}^{2} \frac{\partial}{\partial u^{(i)}} (g \rho_S' (V_{Z(i)} V_{Z(i)})) = -\sum_{X_i \in \mathcal{P}(u,v)} h_i \rho_D' L_X L_t$$
" should be
--
$$\sum_{x_i \in \mathcal{P}(u,v)} h_i \rho_D' L_X L_D - \lambda \sum_{i=1}^{2} \frac{\partial}{\partial u^{(i)}} (g \rho_S' (V_{X(i)} V_{X(i)})) = -\sum_{X_i \in \mathcal{P}(u,v)} h_i \rho_D' L_X L_t$$
$$\sum_{x_i \in \mathcal{P}(u,v)} h_i \rho_D' L_Y L_D - \lambda \sum_{i=1}^{2} \frac{\partial}{\partial u^{(i)}} (g \rho_S' (V_{Y(i)} V_{y(i)})) = -\sum_{X_i \in \mathcal{P}(u,v)} h_i \rho_D' L_X L_t$$
$$\sum_{x_i \in \mathcal{P}(u,v)} h_i \rho_D' L_Z L_D - \lambda_Z \sum_{i=1}^{2} \frac{\partial}{\partial u^{(i)}} (g \rho_S' (V_{X(i)} V_{X(i)})) = -\sum_{X_i \in \mathcal{P}(u,v)} h_i \rho_D' L_X L_t$$
--.